(12) United States Patent
Hanzawa

(10) Patent No.: US 12,342,086 B2
(45) Date of Patent: Jun. 24, 2025

(54) IMAGING DEVICE AND IMAGING METHOD

(71) Applicant: SONY SEMICONDUCTOR SOLUTIONS CORPORATION, Kanagawa (JP)

(72) Inventor: Katsuhiko Hanzawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 149 days.

(21) Appl. No.: 18/245,666

(22) PCT Filed: Sep. 8, 2021

(86) PCT No.: PCT/JP2021/032985
§ 371 (c)(1),
(2) Date: Mar. 16, 2023

(87) PCT Pub. No.: WO2022/065034
PCT Pub. Date: Mar. 31, 2022

(65) Prior Publication Data
US 2023/0336884 A1 Oct. 19, 2023

(30) Foreign Application Priority Data
Sep. 28, 2020 (JP) .................................. 2020-162492

(51) Int. Cl.
*H04N 25/47* (2023.01)
*H04N 25/707* (2023.01)
(Continued)

(52) U.S. Cl.
CPC ........... *H04N 25/47* (2023.01); *H04N 25/707* (2023.01); *H04N 25/77* (2023.01); *H04N 25/78* (2023.01)

(58) Field of Classification Search
CPC ...... H04N 25/47; H04N 25/707; H04N 25/77; H04N 25/78; H04N 25/79
See application file for complete search history.

(56) References Cited

U.S. PATENT DOCUMENTS

| 2017/0059399 A1* | 3/2017 | Suh ........................ H04N 25/75 |
| 2019/0052820 A1* | 2/2019 | Berner .................. H04N 25/50 |
| 2021/0067100 A1* | 3/2021 | Choi ..................... H03F 1/0211 |

FOREIGN PATENT DOCUMENTS

| JP | 2020-088480 A | 6/2020 |
| JP | 2020-096347 A | 6/2020 |
| WO | 2019/087471 A1 | 5/2019 |

OTHER PUBLICATIONS

International Search Report and Written Opinion of PCT Application No. PCT/JP2021/032985, issued on Nov. 22, 2021, 09 pages of ISRWO.

* cited by examiner

Primary Examiner — Albert H Cutler
(74) Attorney, Agent, or Firm — CHIP LAW GROUP

(57) ABSTRACT

Provided is an imaging device that includes a pixel array section including a plurality of dynamic vision sensor (DVS) pixels that outputs a luminance signal according to a light amount, and a detection circuit section that is disposed outside the pixel array section and outputs a detection signal indicating occurrence of an address event in a case where the luminance signal of each of the plurality of DVS pixels exceeds a predetermined threshold value. Furthermore, each of DVS pixel includes a photoelectric conversion element that outputs a signal corresponding to a light amount, a logarithmic conversion circuit that logarithmically converts the signal, a signal holding circuit that holds the luminance (Continued)

signal converted by the logarithmic conversion circuit, and a readout circuit that reads the luminance signal held in the signal holding circuit.

13 Claims, 33 Drawing Sheets

(51) Int. Cl.
*H04N 25/77* (2023.01)
*H04N 25/78* (2023.01)

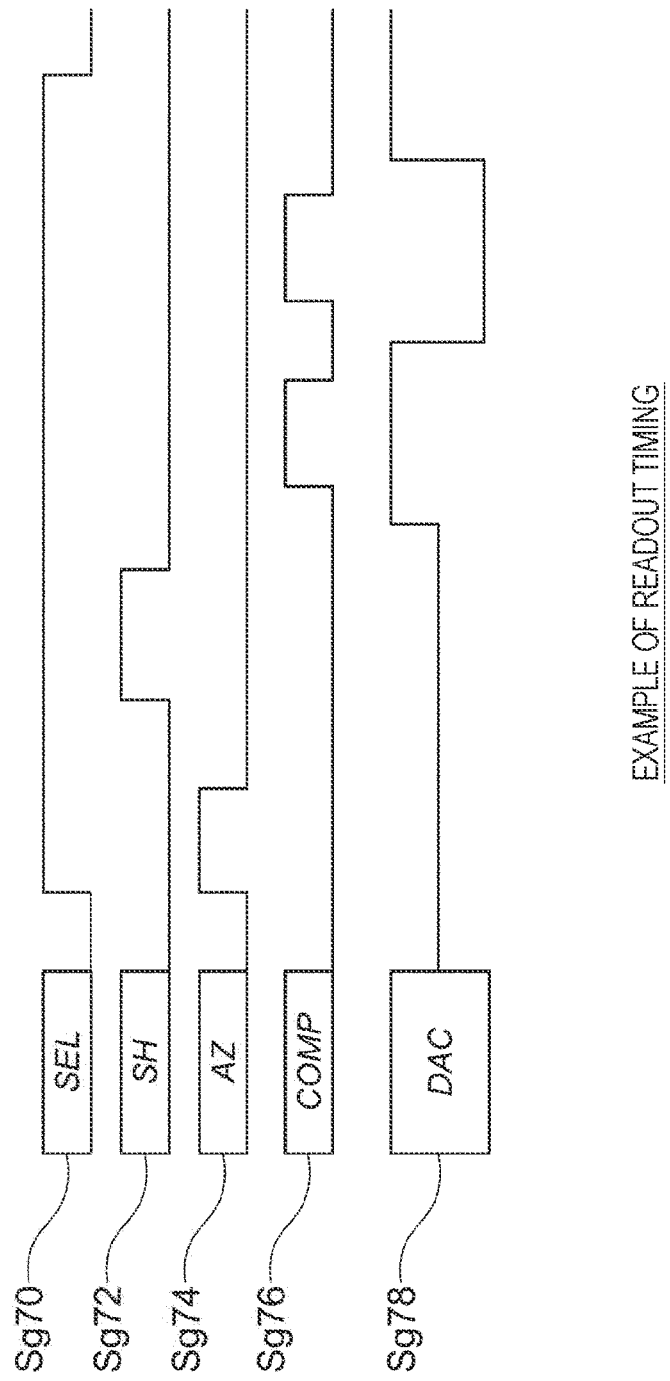

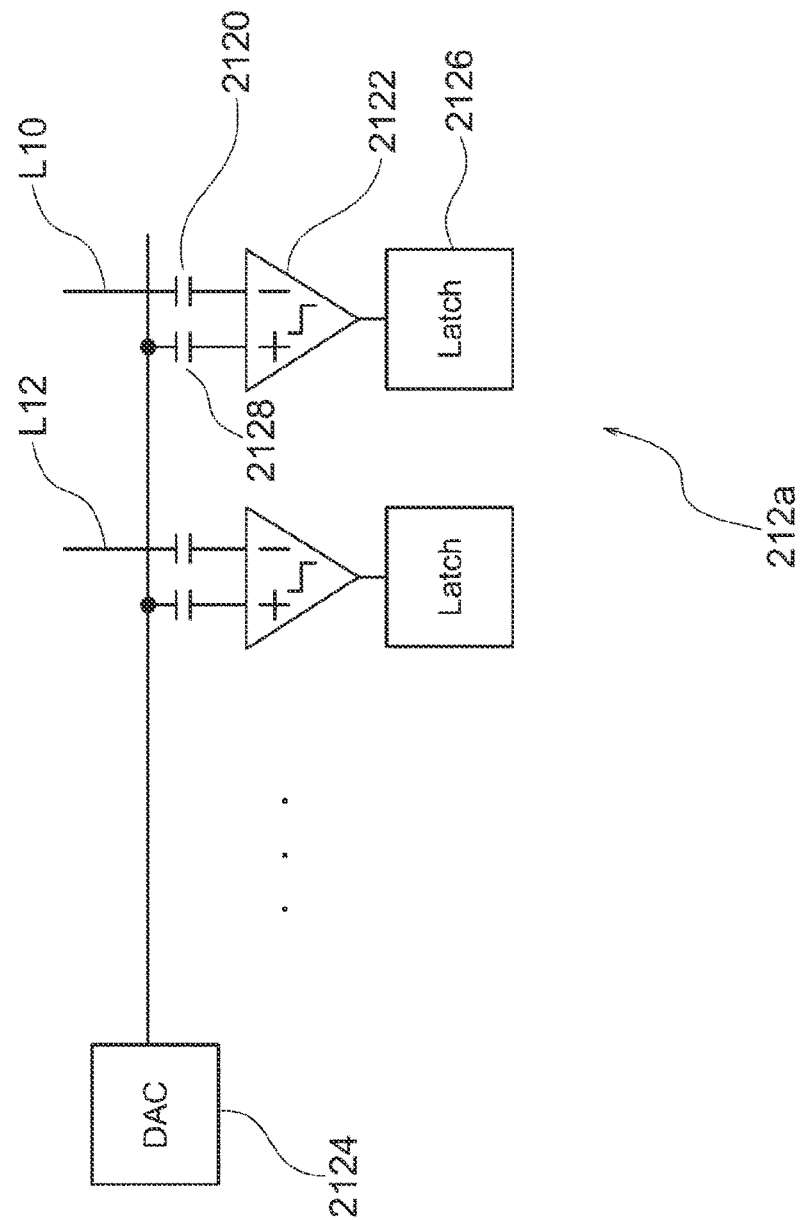

IMAGING DEVICE AND IMAGING METHOD

CROSS REFERENCE TO RELATED APPLICATIONS

This application is a U.S. National Phase of International Patent Application No. PCT/JP2021/032985 filed on Sep. 8, 2021, which claims priority benefit of Japanese Patent Application No. JP 2020-162492 filed in the Japan Patent Office on Sep. 28, 2020. Each of the above-referenced applications is hereby incorporated herein by reference in its entirety.

TECHNICAL FIELD

The present disclosure relates to an imaging device and an imaging method.

BACKGROUND ART

A synchronous solid-state imaging element that captures image data (frame) in synchronization with a synchronization signal such as a vertical synchronization signal is used in an imaging device or the like. In this general synchronous solid-state imaging element, image data can be acquired only in every cycle (for example, 1/60 seconds) of a synchronization signal, and thus, in fields related to traffic, robots, and the like, it is difficult to cope with a case where faster processing is required. Accordingly, an asynchronous solid-state imaging element has been proposed in which a detection circuit that detects, for each pixel address, that the light amount of the pixel exceeds a threshold value as an address event in real time is provided for each pixel. The solid-state imaging element that detects an address event for each pixel in this manner is called a dynamic vision sensor (DVS). It is possible to generate and output data at a much higher speed than the synchronous solid-state imaging element. For this reason, for example, in the traffic field, it is possible to improve safety by executing processing of recognizing an image of a person or an obstacle at high speed. Furthermore, a detection circuit that detects an address event of the DVS is provided in the pixel array section.

CITATION LIST

Patent Document

Patent Document 1: WO 2019/087471

SUMMARY OF THE INVENTION

Problems to be Solved by the Invention

On the other hand, the pixel array section has been further downsized. However, if the detection circuit is provided in the pixel array section, downsizing may be hindered.

Accordingly, the present disclosure provides an imaging device that can be further downsized and an imaging method.

Solutions to Problems

In order to solve the problem described above, according to the present disclosure, there is provided an imaging device including:

a pixel array section including a plurality of dynamic vision sensor (DVS) pixels that outputs a luminance signal according to a light amount; and a detection circuit section that is disposed outside the pixel array section and outputs a detection signal indicating occurrence of an address event in a case where the luminance signal of each of the plurality of DVS pixels exceeds a predetermined threshold value, in which the DVS pixel includes a photoelectric conversion element that outputs a signal corresponding to a light amount, a logarithmic conversion circuit that logarithmically converts the signal, a signal holding circuit that holds the luminance signal converted by the logarithmic conversion circuit, and a readout circuit that reads the luminance signal held in the signal holding circuit.

The detection circuit section may include at least one comparator, and a reference generation circuit that outputs a reference voltage, and a luminance signal read from the readout circuit and the reference voltage are input to the comparator.

The detection circuit section may include a plurality of detection circuits, and the detection circuit section may include a reference generation circuit corresponding to each detection circuit.

The luminance signal read from the readout circuit in time series from each of a plurality of the DVS pixels arranged in a column may be input to the plurality of detection circuits.

The detection circuit section may include a plurality of detection circuits, and the reference generation circuit may supply the reference voltage to the plurality of detection circuits.

In the comparator, at least one of two inputs of the comparator may be capacitively coupled, and at least one of the luminance signal or the reference voltage may be connected.

The luminance signal may be input to the comparator via the capacitively coupled capacitor, an initial first luminance signal is input after the capacitor is initialized, and a second luminance signal held in the signal holding circuit may be subsequently input.

The comparator may be of multi-bit and also capable of analog-to-digital conversion.

The readout circuit may include an amplification transistor connected in series between a reference power supply and a signal line connected to the detection circuit, and a selection transistor, and a capacitor of the signal holding circuit may be connected between a gate of the amplification transistor and a reference potential.

An anode of the photoelectric conversion element may be connected to the logarithmic conversion circuit via a first switching element, and may be connected to one end of the capacitor on a side of the reference power supply via a second switching element.

An anode of the photoelectric conversion element may be connected to one end of the capacitor on the side of the reference power supply via a first switching element, a floating capacitor, and a third switching element.

The first luminance signal may be read from all of the plurality of DVS pixels in synchronization with a readout cycle of the first luminance signal.

A reset transistor that a reset transistor that initializes stored charges of the floating capacitor may be connected between the floating capacitor and a reference power supply.

In a case where the second switching element turns to a conductive state, the first switching element and the third switching element may be in a non-conductive state.

An anode of the photoelectric conversion element may be connected to a second readout circuit via a second switching element.

The pixel array section may further include a gradation pixel.

According to the present disclosure, there is provided an imaging method of an imaging device that is a control method of an imaging device, the imaging device including a pixel array section including a plurality of dynamic vision sensor (DVS) pixels that outputs a luminance signal according to a light amount, and a detection circuit section that is disposed outside the pixel array section and outputs a detection signal indicating occurrence of an address event in a case where the luminance signal of each of the plurality of DVS pixels exceeds a predetermined threshold value, in which the detection circuit section includes a comparator to which the luminance signal read from the readout circuit and the reference voltage are input, and the luminance signal is input to the comparator via a capacitively coupled capacitor of the comparator, an initial first luminance signal is input after the capacitor is initialized, and a second luminance signal held in the pixel array section is subsequently input.

BRIEF DESCRIPTION OF DRAWINGS

FIG. 7 is a diagram depicting an operation example of the DVS pixel and the event detection circuit.

FIG. 10B is a diagram depicting a configuration example in which a capacitor is provided at an input terminal on a side of signal lines, and a capacitor is provided at the input terminal on the digital-to-analog converter side.

MODE FOR CARRYING OUT THE INVENTION

Hereinafter, embodiments of an imaging device and an imaging method will be described with reference to the drawings. Although main components of the imaging device will be mainly described below, the imaging device may have components and functions that are not depicted or described. The following description does not exclude components and functions that are not depicted or described.

First Embodiment

[Configuration Example of Imaging Device]

Figure 1:
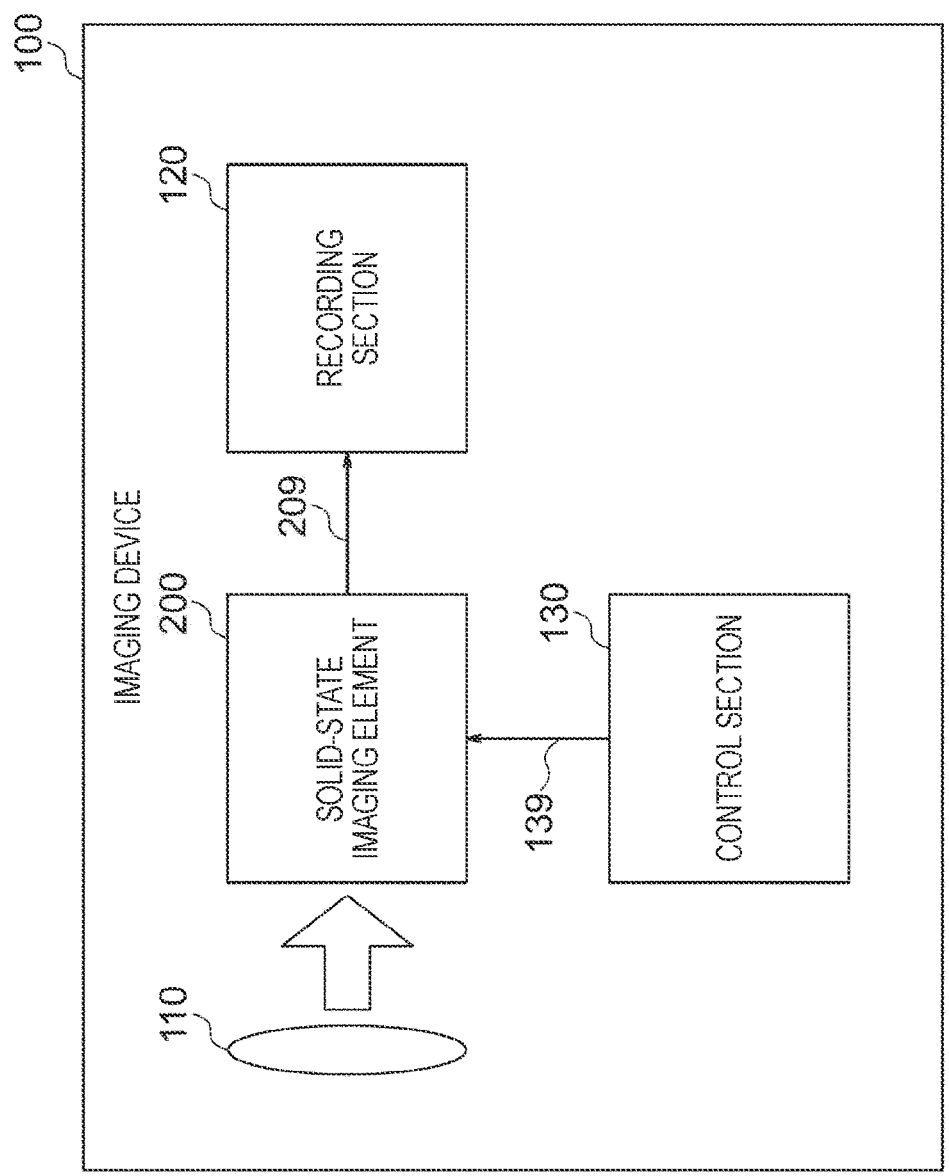
FIG. 1 is a block diagram depicting an example of a configuration of an image device to which a technology according to the present disclosure is applied.

FIG. 1 is a block diagram depicting a configuration example of an imaging device 100 according to an embodiment of the present technology. The imaging device 100 includes an imaging lens 110, a solid-state imaging element 200, a recording section 120, and a control section 130. As the imaging device 100, a camera mounted on a wearable device, an in-vehicle camera, or the like is assumed.

The imaging lens 110 condenses incident light and guides the light to the solid-state imaging element 200. The solid-state imaging element 200 includes a DVS pixel. The DVS pixel can output a detection signal used to detect an address event indicating that the absolute value of the luminance change amount exceeds the threshold value. The address event includes, for example, an on event indicating that the amount of increase in luminance exceeds an upper limit threshold value and an off event indicating that the amount of decrease in luminance falls below a lower limit threshold value less than the upper limit threshold value. Then, the solid-state imaging element 200 generates a detection signal indicating the detection result of the address event for each DVS pixel. Each of the detection signals includes an on event detection signal VCH indicating presence or absence of an on event and an off event detection signal VCL indicating presence or absence of an off event. Note that although the solid-state imaging element 200 detects the presence or absence of both the on event and the off event, it is also possible to detect only one of the on event and the off event.

On the other hand, a gradation pixel outputs a gradation luminance signal. A gradation image is formed on the basis of the gradation luminance signal output from the gradation pixel. Note that, in the present embodiment, an image based on a detection signal of a DVS pixel is referred to as a 1 DVS image, and an image based on a gradation luminance signal output from a gradation pixel is referred to as a gradation image.

The solid-state imaging element 200 outputs the DVS image to the recording section 120 via a signal line 209.

The recording section 120 records data from the solid-state imaging element 200. The control section 130 controls the solid-state imaging element 200 to capture image data.

[Configuration Example of Solid-State Imaging Element]

Figure 2:
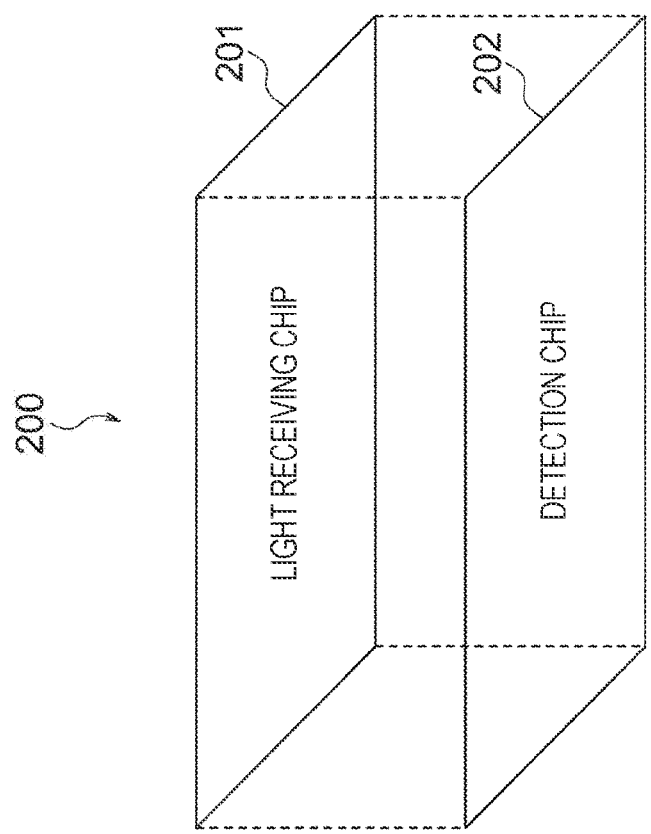
FIG. 2 is a diagram depicting an example of a stacked structure of a solid-state imaging element.

FIG. 2 is a diagram depicting an example of a stacked structure of the solid-state imaging element 200 according to the embodiment of the present technology. The solid-state imaging element 200 includes a detection chip 202 and a light receiving chip 201 stacked on the detection chip 202. These substrates are electrically connected via a connection portion such as a via. Note that, in addition to the via, connection can also be made by Cu—Cu bonding or a bump.

Figure 3:
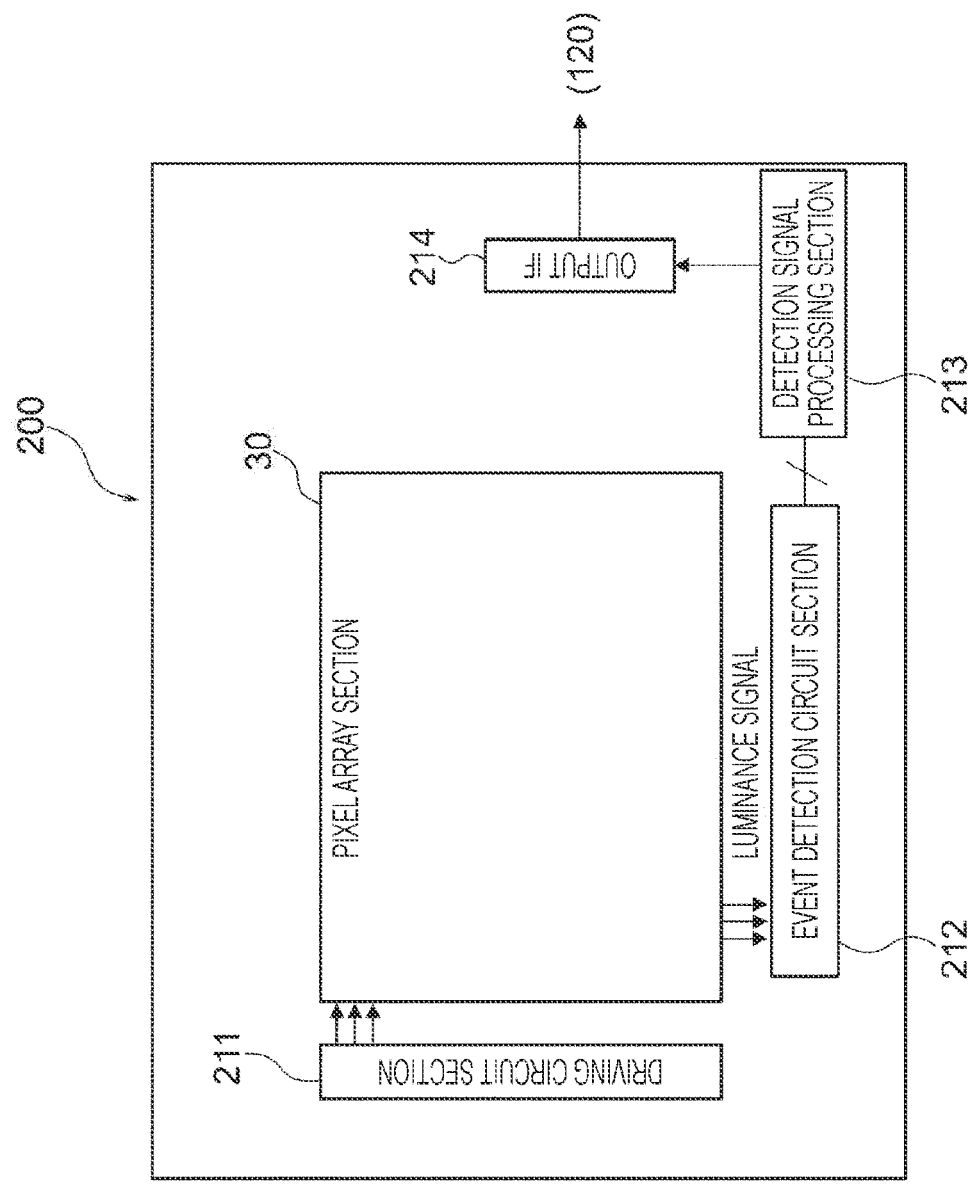
FIG. 3 is a block diagram depicting a configuration example of the solid-state imaging element.

FIG. 3 is a block diagram depicting a configuration example of the solid-state imaging element 200. As depicted in FIG. 3, a solid-state imaging element 200 according to the present disclosure is a device capable of imaging a DVS. The solid-state imaging element 200 includes a pixel array section 30, a driving circuit section 211, a detection circuit section 212, a first signal processing section 213, and an output interface 214.

In the pixel array section 30, a plurality of DVS pixels 31 is arranged in a two-dimensional lattice pattern. These DVS pixels 31 supply luminance signals to the event detection circuit section 212.

The driving circuit 211 drives the DVS pixels 31 in the pixel array section 30 to output a luminance signal. For example, the driving circuit 211 performs control to sequentially output luminance signals for each row from the plurality of DVS pixels 31 in the pixel array section 30. More specifically, when driving the DVS pixels 31, the driving circuit 211 drives the DVS pixels 31 in synchronization with, for example, a vertical synchronization signal. Here, the vertical synchronization signal is a signal of a predetermined frequency (such as 30 hertz) indicating imaging timing of the image data.

The event detection circuit section 212 performs processing of detecting the address event on the detection signal from the pixel array section 30.

The detection signal processing section 213 executes predetermined signal processing such as image recognition processing on the detection signal from the event detection circuit section 212. The detection signal processing section 213 supplies data indicating a processing result to the recording section 120 via a signal line 209.

Figure 4:
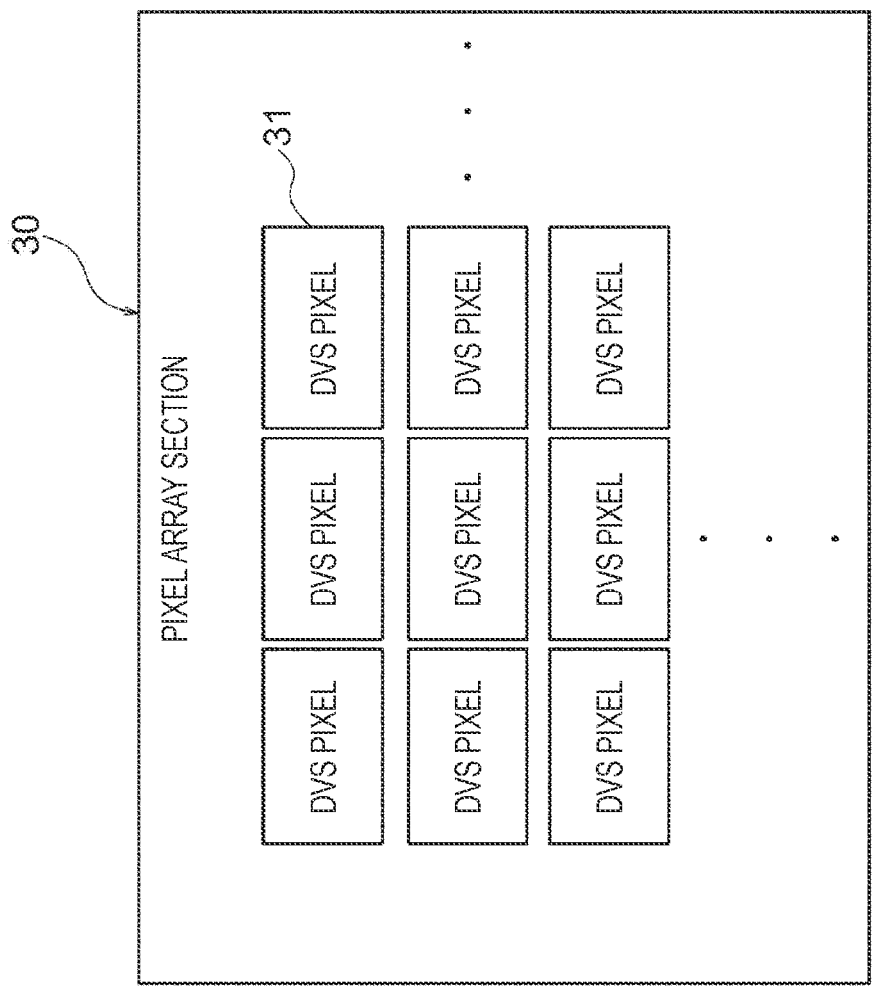
FIG. 4 is a diagram schematically depicting pixel blocks arranged in a matrix.

Here, a configuration of the pixel array section 30 will be described with reference to FIG. 4. FIG. 4 is a diagram schematically depicting the DVS pixels 31 arranged in a matrix in the pixel array section 30. As depicted in FIG. 4, in the pixel array section 30, the plurality of DVS pixels 31 is two-dimensionally arranged in a matrix (array).

Figure 5:
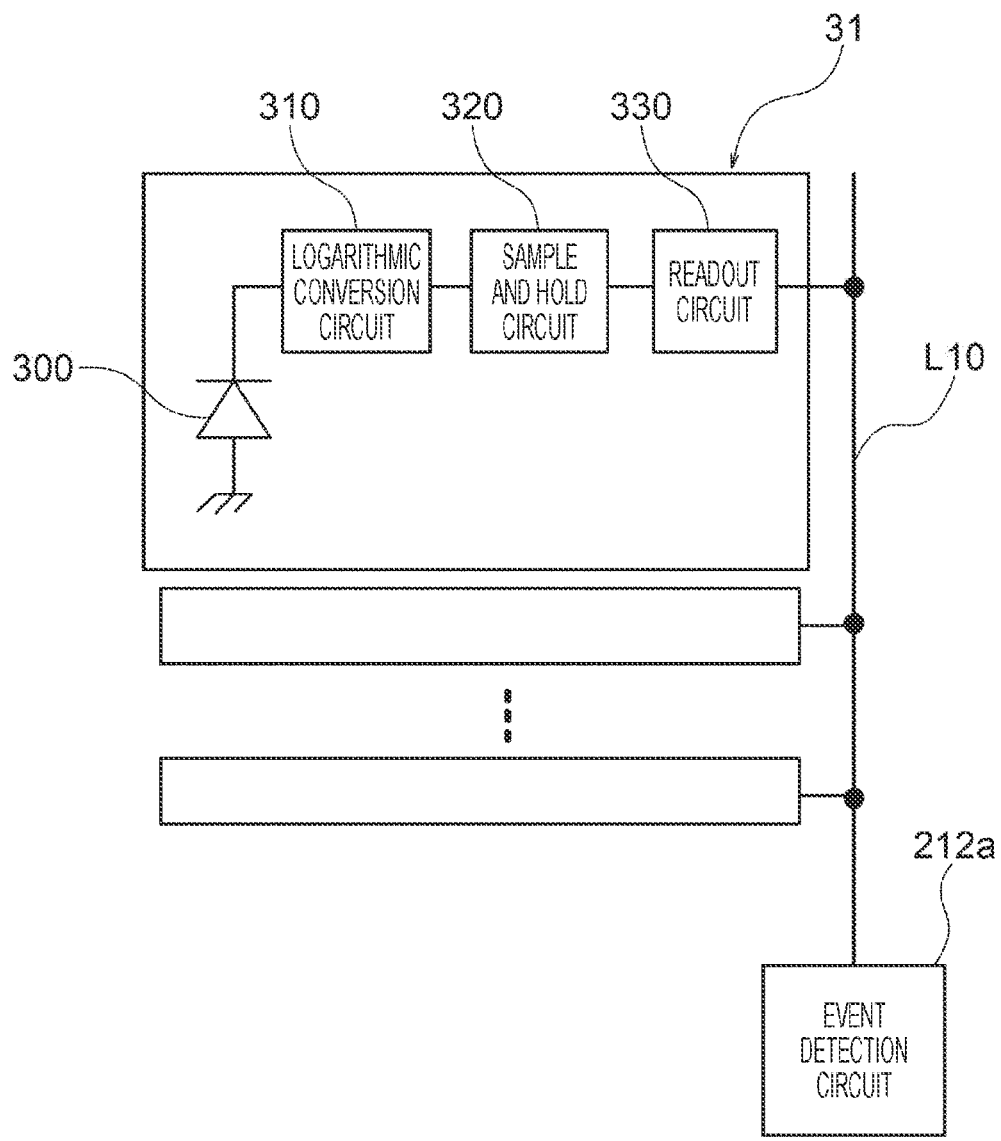
FIG. 5 is a diagram schematically depicting a configuration of a DVS pixel.

A configuration of the DVS pixels 31 will be described on the basis of FIG. 5. FIG. 5 is a diagram schematically depicting a configuration of the DVS pixels 31. As depicted in FIG. 5, a signal line L10 is wired to the plurality of DVS pixels 31 arranged in a column.

The DVS pixel 31 includes a photoelectric conversion element 300, a logarithmic conversion circuit 310, a sample and hold circuit 320, and a readout circuit 330. The photoelectric conversion element 300 generates a photocurrent by photoelectric conversion on the incident light.

The logarithmic conversion circuit 310 logarithmically converts the photocurrent into a pixel voltage Vlog. The logarithmic conversion circuit 310 supplies the pixel voltage Vlog to the sample and hold circuit 320.

The sample and hold circuit 320 reduces the pixel voltage Vlog supplied from the logarithmic conversion circuit 310 according to a gain coefficient, and samples and holds the pixel voltage as a pixel voltage Vsh. Then, the sample and hold circuit 320 supplies the pixel voltage Vsh to the readout circuit 330.

The readout circuit 330 supplies the pixel voltage Vsh supplied from the sample and hold circuit 320 to an event detection circuit 212a corresponding to the arrangement column.

The event detection circuit 212a detects the address event on the basis of the pixel voltage Vsh supplied in time series from the sample and hold circuit 320. Note that the pixel voltage Vsh according to the present embodiment corresponds to a luminance signal.

Figure 6:
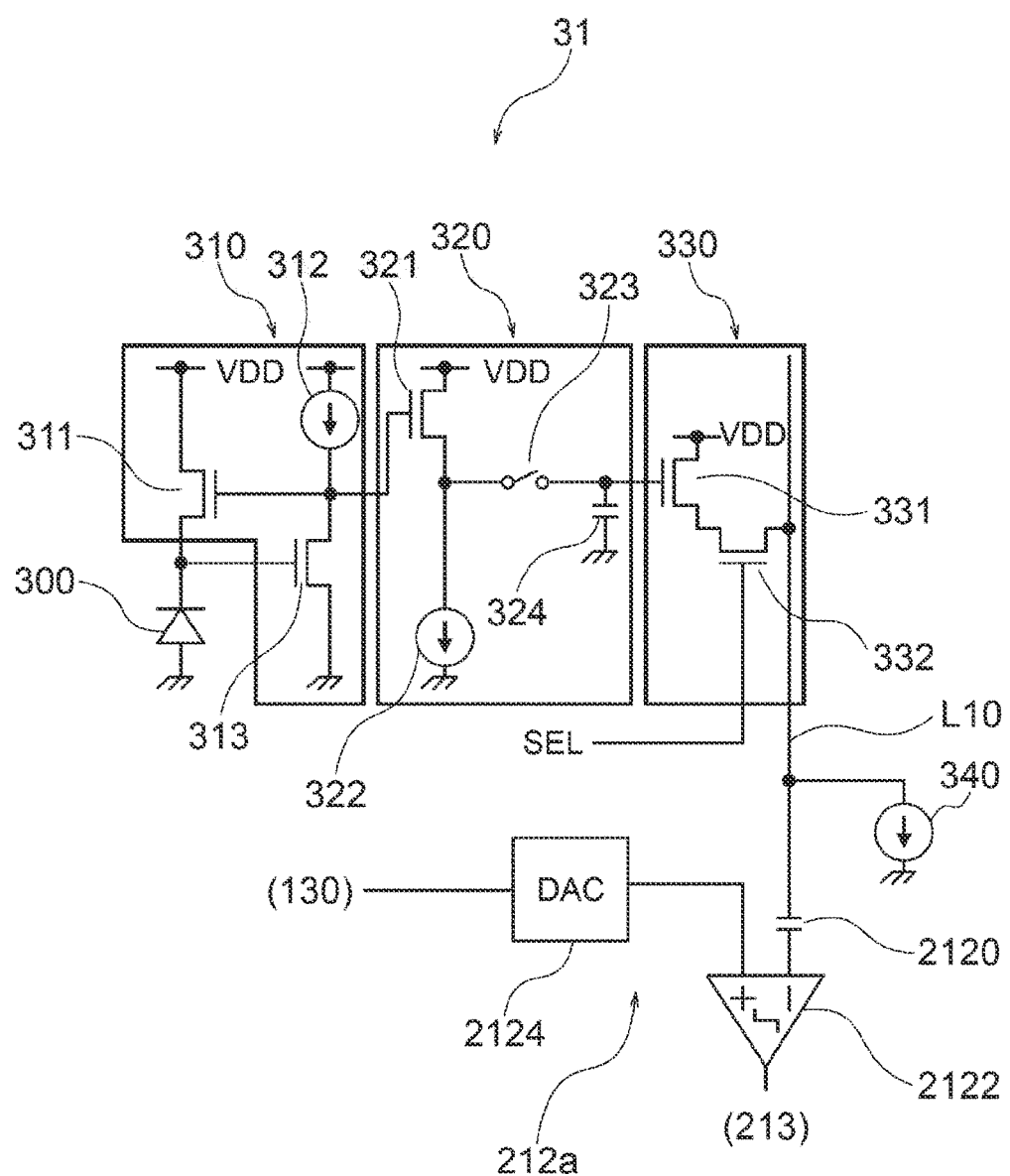
FIG. 6 is a diagram depicting a configuration example of the DVS pixel and an event detection circuit.

FIG. 6 is a diagram depicting a configuration example of the DVS pixel 31 and the event detection circuit 212a. As depicted in FIG. 6, the logarithmic conversion circuit 310 includes N-type transistors 311 and 313 and a current source 312. As the N-type transistors 311 and 313, for example, metal-oxide-semiconductor (MOS) transistors are used.

A source of the N-type transistor 311 is connected to a cathode of the photoelectric conversion element 300, and a drain is connected to a power supply terminal VDD. The current source 312 and the N-type transistor 313 are connected in series between the power supply terminal VDD and a reference terminal of a predetermined reference potential (such as ground potential). Furthermore, a connection point of the current source 312 and the N-type transistor 313 is connected to a gate of the N-type transistor 311 and an input terminal of the sample and hold circuit 320. A connection point of the N-type transistor 311 and the photoelectric conversion element 300 is connected to a gate of the N-type transistor 313. With such a configuration, the photocurrent of the photoelectric conversion element 300 is logarithmically converted into the pixel voltage Vlog. Note that the logarithmic conversion circuit 310 is an example, and the present disclosure is not limited thereto.

The sample and hold circuit 320 includes an N-type transistor 321, a current source 322, a switching element 323, and a capacitor 324. The N-type transistor 321 and the current source 322 are connected in series between the power supply terminal VDD and the reference terminal of the predetermined reference potential (such as ground potential). The pixel voltage Vlog is supplied to a gate of the N-type transistor 321. The switching element 323 is, for example, an N-type transistor.

A connection point between the N-type transistor 321 and the current source 322 is connected to one end of the switching element 323, and the other end thereof is connected to an input terminal of the readout circuit 330. Furthermore, the other end of the switching element 323 is connected to one end of the capacitor 324. The other end of the capacitor 324 is connected to the reference terminal of the predetermined reference potential (such as ground potential). That is, the N-type transistor 321 and the current source 322 constitute a source follower. As can be seen, the pixel voltage Vlog is converted into the pixel voltage Vsh so as to follow the pixel voltage Vlog by a source follower including the N-type transistor 321 and the current source 322, and is applied to the one end of the capacitor 324 via the switching element 323. Thus, in a case where the switching element 323 is in a conductive state (ON), the potential at the one end of the capacitor 324 becomes the predetermined reference potential+the pixel voltage Vsh. Then, when the switching element 323 is in a non-conductive state (OFF), the sample and hold circuit 320 holds the potential of the predetermined reference potential+the pixel voltage Vsh. As can be seen, a positive potential is always applied to the one end of the capacitor 324.

As described above, the capacitor 324 is used for holding the pixel voltage Vsh, and thus the gain of the pixel voltage Vsh does not change in the capacitor 324. Furthermore, the capacitor 324 is used only for signal holding, and thus it is possible to use various capacitors such as capacitor elements used in MOS, metal-insulator-metal (MIM), and DRAM.

Note that, in the present embodiment, in order to simplify the description, a predetermined reference potential is treated as zero potential in the following description. Further, the sample and hold circuit 320 according to the present embodiment uses the N-type transistor 321, but is not limited thereto. For example, the source follower may be formed by an N-type transistor. Furthermore, in a case where not electrons but holes are used as carriers, the polarities of the NMOS and the PMOS change, and the connection is reversed.

The readout circuit 330 includes an amplification transistor 331 and a selection transistor 332. The transistor 331 and the transistor 332 are connected in series. One end of the transistor 331 is connected to the power supply terminal VDD, and the other end of the transistor 332 is connected to the event detection circuit 212a via the vertical signal line L10. The pixel voltage Vsh is supplied from the sample and hold circuit 320 to a gate of the amplification transistor 331. Furthermore, a selection signal SEL is supplied to a gate of the selection transistor 332. The amplification transistor 331 and the current source 340 are formed as source followers.

Thus, the amplification transistor 331 outputs a level corresponding to the charge accumulated in the capacitor 324, that is, the pixel voltage Vsh to the signal line L10 via the selection transistor 332. The selection transistor 332 is driven in accordance with the selection signal SEL, and when the selection transistor 332 is turned on, the pixel voltage Vsh output from the amplification transistor 331 can be output to the signal line L10. That is, it is selected to output the pixel voltage Vsh from the DVS pixel 31.

The event detection circuit 212a includes a capacitor 2120, a comparator 2122, and a digital-to-analog converter (DAC) 2124. Note that the digital-to-analog converter (DAC) 212 according to the present embodiment corresponds to the reference generation circuit.

A signal line L10 is connected to one end of the capacitor 2120. On the other hand, the other end of the capacitor 2120 is connected to one end of the comparator 2122. The digital-to-analog converter 2124 is connected to the other end of the comparator 2122. With such a configuration, at the time of detecting the on event, a reference voltage corresponding to a threshold value of the on event is input from the digital-to-analog converter 2124 to the other end of the comparator 2122. Similarly, when the off event is detected, the reference voltage corresponding to a threshold value of the off event is input from the digital-to-analog converter 2124 to the other end of the comparator 2122.

FIG. 7 is a diagram depicting an operation example of the DVS pixel 31 and the event detection circuit 212a. The horizontal axis represents time. A signal Sg70 indicates a row selection signal (SEL), a signal Sg72 indicates an ON signal (SH) of the switching element 323, a signal Sg74 indicates a zero reset signal (AZ) of the capacitor 2120, a signal Sg76 indicates a drive signal of the comparator 2122, and a signal Sg78 indicates an output signal of the digital-to-analog converter 2124. As described above, the pixel voltage Vsh is sampled and held in time series. In the present embodiment, among the pixel voltage Vsh sampled and held in time series, the pixel voltage Vsh sampled and held first is referred to as a pixel voltage Vsh1, and the pixel voltage Vsh sampled and held next is referred to as a pixel voltage Vsh2.

In FIG. 7, a state in which the pixel voltage Vsh1 is sampled and held in the sample and hold circuit 320 will be described. Under the control of the driving circuit 211, the signal Sg70 becomes a high level, and the selection transistor 332 is brought to a conductive state.

Next, the signal Sg74 becomes a high level, and the capacitor 2120 is reset to zero (AZ). At the moment when the signal Sg74 becomes low level, the pixel voltage Vsh1 is applied to a terminal of the capacitor 2120 on the DVS pixel 31 side. In the capacitor 2120, first, a charge according to the potential difference between the voltage Vsh1 and the comparator 2122 side is accumulated. Note that, in the present embodiment, in order to simplify the description, the potential of the comparator 2122 at the timing when the capacitor 2120 is reset to zero by a reset circuit (not depicted) is set to zero.

Next, the signal Sg76 becomes the high level, the switching element 323 is brought to a conductive state, and the pixel voltage Vsh2 is applied to the capacitor 324. At this moment, the pixel voltage Vsh2 is applied to the terminal of the capacitor 2120 on the DVS pixel 31 side. At this time, the potential of the capacitor 2120 on the side of the comparator 2122 fluctuates while maintaining the accumulated charge, and becomes (pixel voltage Vsh2−pixel voltage Vsh1). Note that the signal Sg76 becomes low level, and the pixel voltage Vsh2 is sampled and held in the sample and hold circuit 320.

Next, the signal Sg78 is changed to the threshold value of the on event. That is, at the time of detecting the on event, a potential signal corresponding to the threshold value of the on event is input from the digital-to-analog converter 2124 to the other end of the comparator 2122. Thus, a potential of (pixel voltage Vsh2−pixel voltage Vsh1) is applied to one end of the comparator 2122, and the potential signal corresponding to the threshold value of the on event is input to the other end of the comparator 2122.

Next, the signal Sg76 becomes the high level, and the comparator 2122 is driven. Thus, the comparator 2122 compares (pixel voltage Vsh2−pixel voltage Vsh1) with the threshold value of the on event, and outputs a true value when (pixel voltage Vsh2−pixel voltage Vsh1) is equal to or more than the threshold value of the on event, and outputs a false value when (pixel voltage Vsh2−pixel voltage Vsh1) is smaller than the threshold value of the on event.

Next, the signal Sg76 becomes low level, and the driving of the comparator 2122 is stopped. Subsequently, the signal Sg78 is changed to the threshold value of the off event.

Next, the signal Sg76 becomes the high level, and the comparator 2122 is driven. Thus, the comparator 2122 compares (pixel voltage Vsh2−pixel voltage Vsh1) with the threshold value of the off event, and outputs a true value when (pixel voltage Vsh2−pixel voltage Vsh1) is equal to or less than the threshold value of the off event, and outputs a false value when (pixel voltage Vsh2−pixel voltage Vsh1) is larger than the threshold value of the off event. Then, the signal Sg76 becomes low level, the driving of the comparator 2122 is stopped, the signal Sg78 subsequently becomes the reference level (for example, zero), the signal Sg70 becomes the low level, and the selection transistor 332 is brought to a non-conductive state. Then, the pixel voltage Vsh2 is set as the pixel voltage Vsh1, the signal Sg70 becomes the high level, and the next detection cycle is started.

Figure 8A:
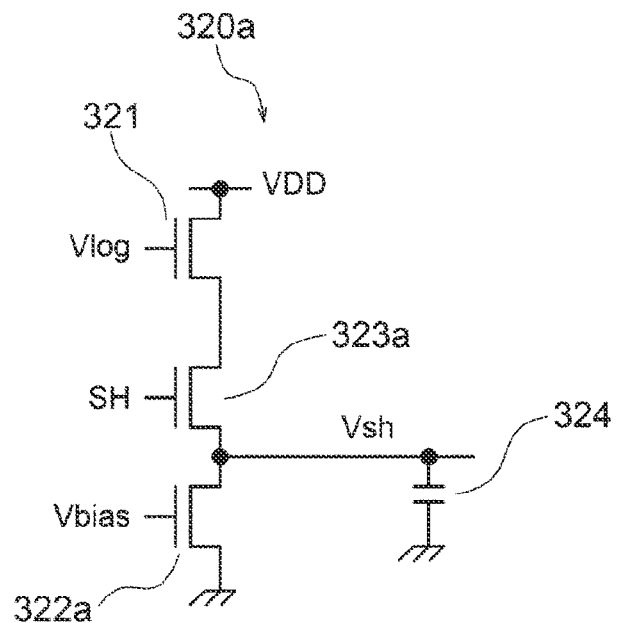
FIG. 8A is a block diagram depicting another configuration example of a sample and hold circuit.

FIG. 8A is a block diagram depicting another configuration example of the sample and hold circuit 320. As depicted in FIG. 8A, a sample and hold circuit 320a includes the N-type transistor 321, a switching transistor 323a, a bias transistor 322a, and the capacitor 324. The N-type transistor 321, the switching transistor 323a, and the bias transistor 322a are connected in series between the power supply terminal VDD and the reference terminal of the predetermined reference potential (such as ground potential). The one end of the capacitor 324 is connected to a connection point between the switching transistor 323a and the bias transistor 322a. A signal corresponding to the signal Sg72 (see FIG. 7) is supplied to a gate of the switching transistor 323a, and a bias signal is supplied to a gate of the bias transistor 322a. That is, the bias signal is supplied at the timing when the signal Sg72 is turned on, and the voltage at which the bias transistor 322a is turned off is supplied at the timing when the signal Sg72 is turned off. As described above, the sample and hold circuit 320a depicted in FIG. 8A has a function equivalent to the sample and hold circuit 320 (see FIG. 6).

Figure 8B:
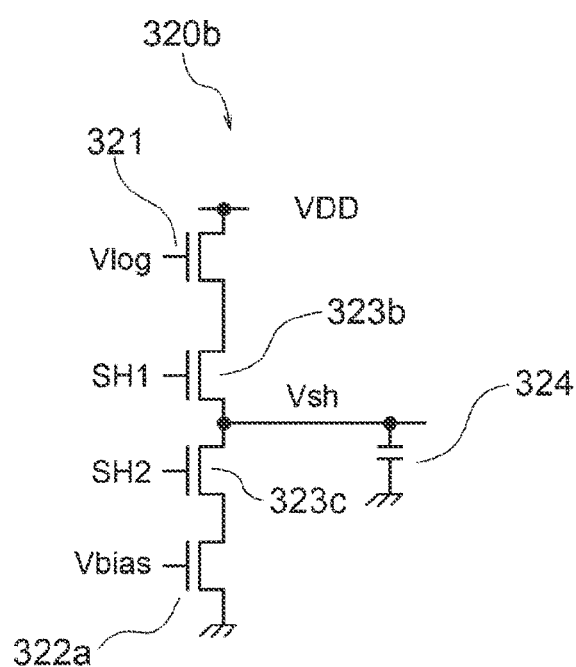
FIG. 8B is a block diagram depicting still another configuration example of the sample and hold circuit.

FIG. 8B is a block diagram depicting still another configuration example of the sample and hold circuit 320. As depicted in FIG. 8B, a sample and hold circuit 320b includes the N-type transistor 321, a switching transistor 323b, a switching transistor 323c, the bias transistor 322a, and the capacitor capacitor 324. The N-type transistor 321, the switching transistor 323b, the switching transistor 323c, and the bias transistor 322a are connected in series between the power supply terminal VDD and the reference terminal of the predetermined reference potential (such as ground potential). The one end of the capacitor capacitor 324 is connected to a connection point between the switching transistor 323b and the switching transistor 323c. A signal corresponding to the signal Sg72 (see FIG. 7) is supplied to gates of the switching transistors 323b and 323c, and the bias signal is supplied to a gate of the bias transistor 322a. As can be seen from these, the sample and hold circuit 320b depicted in FIG. 8B has a function equivalent to the sample and hold circuit 320 (see FIG. 6).

Figure 8C:
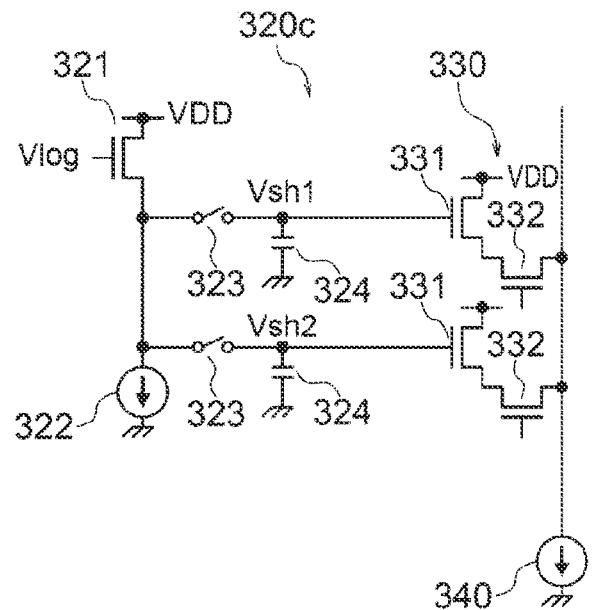
FIG. 8C is a block diagram depicting a configuration example of a sample and hold circuit including two capacitors.

FIG. 8C is a block diagram depicting a configuration example of a sample and hold circuit 320c including two capacitors 324. As depicted in FIG. 8C, the switching element 323, the capacitor 324, the amplification transistor 331, and the selection transistor 332 are formed in parallel at two connection points between the N-type transistor 321 and the current source 322. Thus, it is possible to store the charge corresponding to the pixel voltage Vsh1 in one capacitor 324 and store the charge corresponding to the pixel voltage Vsh2 in the other capacitor 324. By making the number of the capacitors 324 two, the charge corresponding to the pixel voltage Vsh1 can be accumulated, and the charge corresponding to the pixel voltage Vsh2 can be accumulated in the other capacitor 324. Therefore, the pixel voltage Vsh1 and the pixel voltage Vsh2 can be accumulated asynchronously with a readout timing of the readout circuit 330.

Figure 8D:
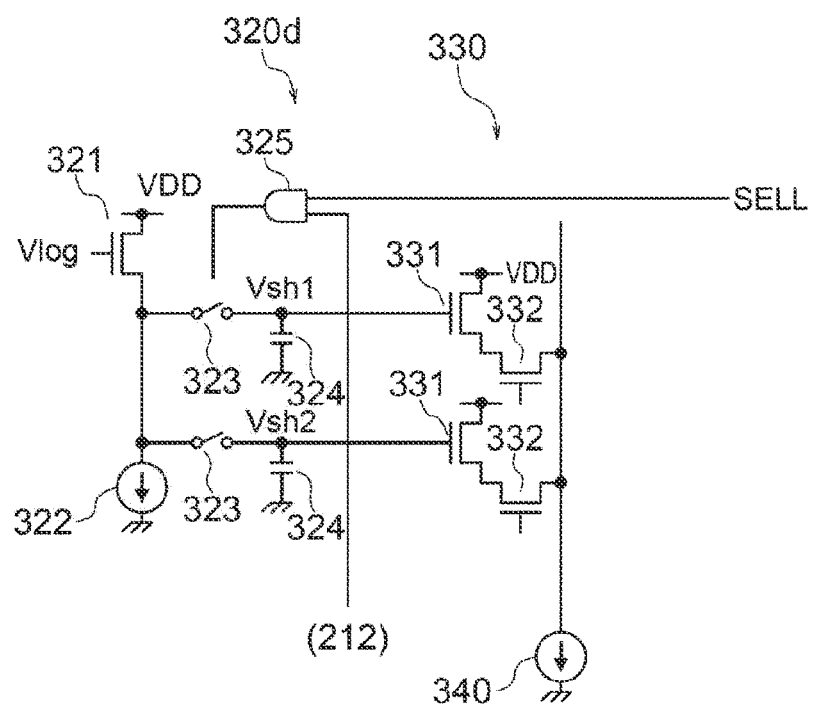
FIG. 8D is a block diagram depicting a configuration example of a sample and hold circuit that performs sample and hold in a case where an address event occurs.

FIG. 8D is a block diagram depicting a configuration example of the sample and hold circuit 320d that performs sample and hold in a case where the address event occurs. As depicted in FIG. 8D, an AND circuit 325 is further provided on a control line that supplies a control signal for the switching element 323 of the sample and hold circuit 320d. The row selection signal SELL and an address event signal from the event detection circuit section 212 are input to the AND circuit 325. Thus, in a case where the address event occurs, it is possible to store the charge corresponding to the pixel voltage Vsh1 in one capacitor 324 and store the charge corresponding to the pixel voltage Vsh2 in the other capacitor 324.

Figure 8E:
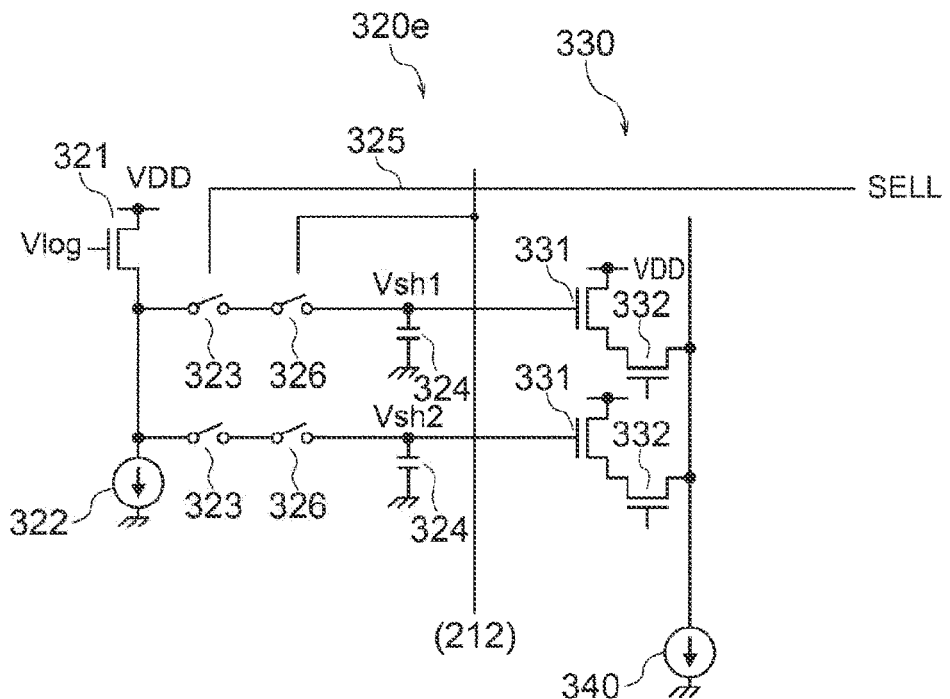
FIG. 8E is a block diagram depicting another configuration example of the sample and hold circuit.

FIG. 8E is a block diagram depicting another configuration example of the sample and hold circuit 320d that performs sample and hold in a case where the address event occurs. The sample and hold circuit 320e is depicted in FIG. 8D in that a switching element 326 is further connected in series between one end of the switching element 323 and the one end of the capacitor 324. This differs from the sample and hold circuit 320d. On/off control of the switching element 326 is performed on the basis of the address event signal from the event detection circuit section 212. Thus, in a case where the address event occurs, it is possible to store the charge corresponding to the pixel voltage Vsh1 in one capacitor 324 and store the charge corresponding to the pixel voltage Vsh2 in the other capacitor 324.

Figure 8F:
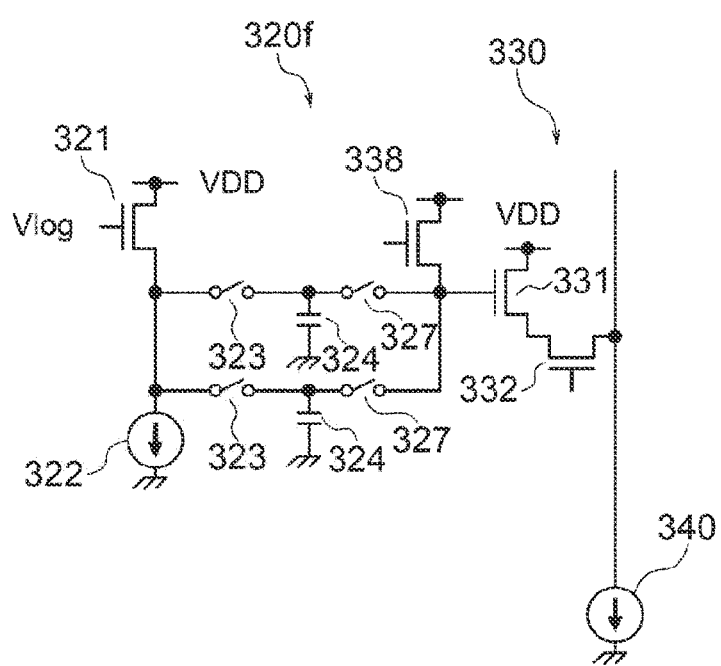
FIG. 8F is a block diagram depicting a configuration example of a sample and hold circuit including two capacitors and a reset transistor.

FIG. 8F is a block diagram depicting a configuration example of a sample and hold circuit 320f including two capacitors 324 and a reset transistor 338. As depicted in FIG. 8F, two switching elements 323 and 327 connected in series are connected in parallel, one ends are connected to connection points between the N-type transistor 321 and the current source 322, and the other ends are connected to the gate of the amplification transistor 331. The one end of each of the capacitors 324 is connected to a connection point of the two switching elements 323 and 327 connected in series. Then, one end of the reset transistor 338 is connected to the other ends of the switching element 323 and the switching element 327 connected in parallel, and the other end of the reset transistor 338 is connected to the power supply voltage VDD. With such a configuration, it is possible to reset to the reference potential before charges corresponding to the pixel voltage Vsh1 and the pixel voltage Vsh2 are accumulated in the respective two capacitors 324. Note that, in a case where the V pixel voltage sh1 and the pixel voltage Vsh2 are averaged and read after the pixel voltage Vsh1 is read, the reset transistor 338 is not turned on, and thus, in a case of averaging, the reset transistor 338 is not necessarily required. Furthermore, destructive reading is performed by the reset transistor 338, and thus the operation of selecting whether to overwrite the pixel voltage Vsh1 and the pixel voltage Vsh2 by the address event as depicted by the sample and hold circuits 320d and f cannot be performed.

Figure 8G:
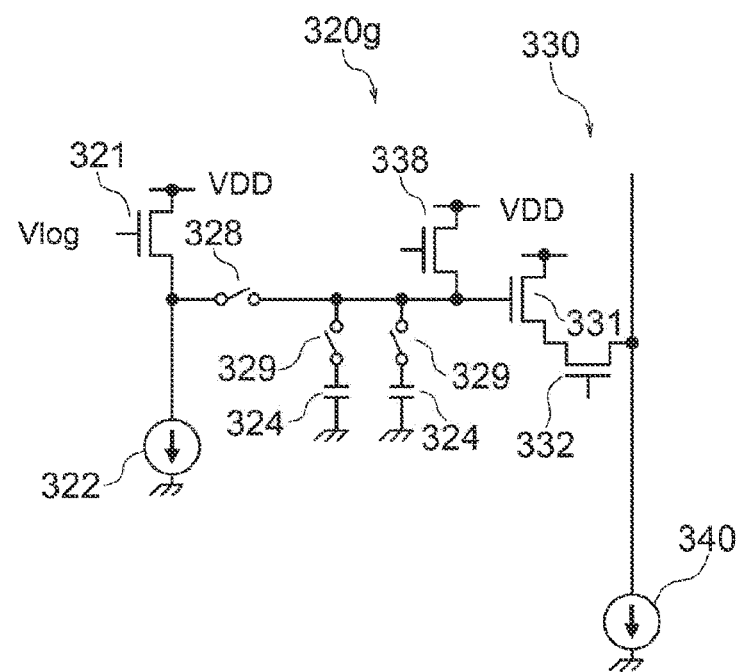
FIG. 8G is a block diagram depicting another configuration example of the sample and hold circuit including two capacitors and a reset transistor.

FIG. 8G is a block diagram depicting another configuration example of the sample and hold circuit 320f including the two capacitors 324 and the reset transistor 338. As depicted in FIG. 8G, one end of a switching element 328 is connected to a connection point between the N-type transistor 321 and the current source 322, and the other end is connected to the gate of the amplification transistor 331. One end of each of two switching elements 329 is connected between the other end of the switching element 328 and the gate of the amplification transistor 331, and the capacitor 324 is connected to the other end. With such a configuration, it is possible to reset to the reference potential before charges corresponding to the pixel voltage Vsh1 and the pixel voltage Vsh2 are accumulated in the respective two capacitors 324. The number of switching elements can be reduced by one as compared with the sample and hold circuit 320f depicted in FIG. 8F, and the pixel array section 30 can be further downsized.

Figure 9:
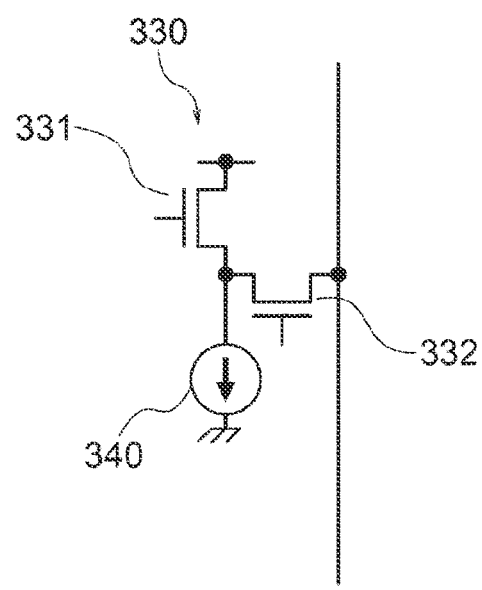
FIG. 9 is a block diagram depicting another configuration example of a readout circuit.

FIG. 9 is a block diagram depicting another configuration example of the readout circuit 330. As depicted in FIG. 9, the current source 340 may be formed in the DVS pixel 31.

Figure 10A:
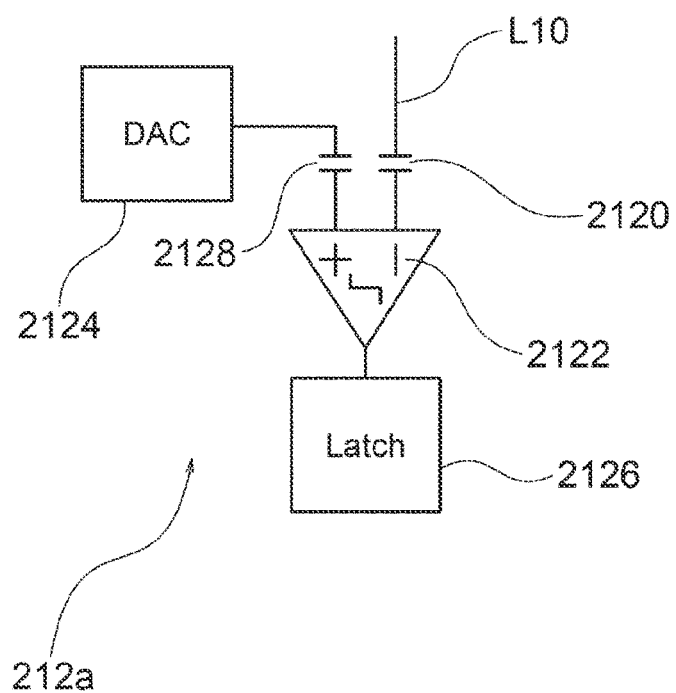
FIG. 10A is a diagram depicting a configuration example in which a capacitor is disposed at an input terminal on a digital-to-analog converter side.

FIG. 10A is a diagram depicting a configuration example in which a capacitor 2128 is disposed at an input terminal on the digital-to-analog converter 2124 side in a comparator 2122. As depicted in FIG. 10A, the capacitor 2128 may be disposed at the input terminal on the digital-to-analog converter 2124 side. Furthermore, a signal holding circuit 2126 is connected to an output terminal of the comparator 2122. Thus, the signal holding circuit 2126 can hold the on-event signal and the off-event signal.

The event detection circuit 212a outputs a signal in a case where a difference (pixel voltage Vsh2−pixel voltage Vsh1) between the two pixel voltages Vsh1 and Vsh2 (see FIG. 7) exceeds a threshold value (meaning both high or low voltage). At least one of the two inputs of the comparator 2122 is coupled with the capacitors 2120 and 2128. Note that a sample and hold circuit may be combined with an input portion of the comparator 2122.

As depicted in FIG. 10A, this is an example in which a threshold value signal is input from one digital-to-analog converter 2124 to one comparator 2122. In such a case, the threshold value can be set for each signal line L10. Note that, in a case where one comparator 2122 is disposed for the readout line L10, on/off events are detected in time series as described above. In addition, multiple values may be detected by performing a plurality of times comparison using not only two threshold values but also a plurality of threshold values. Note that the capacitors 2120 and 2128 of the comparator 2122 are reset via an AZ switch that is not depicted as described above.

Figure 10C:
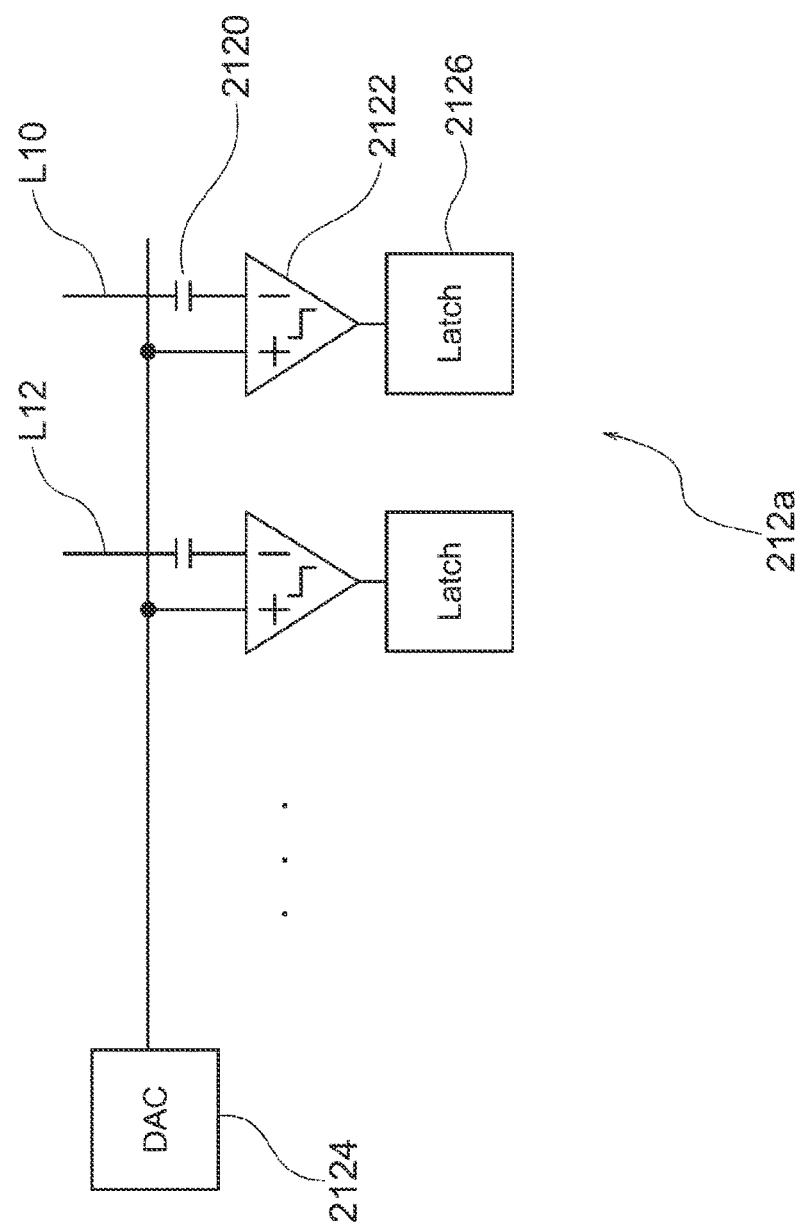
FIG. 10C is a diagram depicting a configuration example in which a capacitor is provided at the input terminal of a comparator on the side of the signal lines.
Figure 10D:
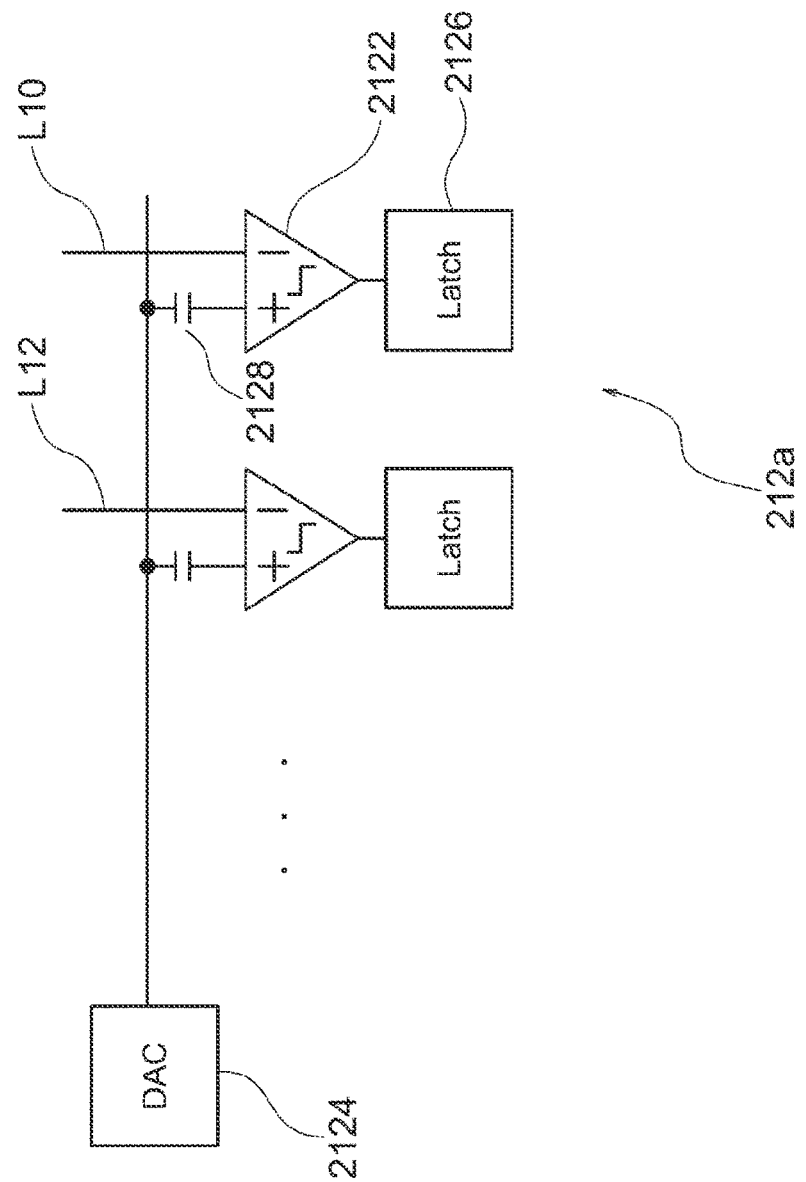
FIG. 10D is a diagram depicting a configuration example in which a capacitor is provided at the input terminal on the digital-to-analog converter side.

FIGS. 10B, 10C, and 10D are diagrams depicting examples in which threshold value signals are input from the digital-to-analog converter 2124 to a plurality of comparators 2122. FIG. 10B is a diagram depicting a configuration example in which a capacitor 21220 is provided at the input terminals of the comparators 2122 on the side of the signal lines L10 and 12, and the capacitor 2128 is provided at the input terminals on the digital-to-analog converter 2124 side. FIG. 10C is a diagram depicting a configuration example in which the capacitor 21220 is provided at the input terminals of the comparators 2122 on the side of the signal lines L10 and 12. FIG. 10D is a diagram depicting a configuration example in which the capacitor 2128 is provided at the input terminals on the digital-to-analog converter 2124 side. In the comparator 2122, a threshold value signal and a luminance signal are input to the comparator 2122 via the capacitively coupled capacitor 2122 or capacitor 2128.

As depicted in FIGS. 10B, 10C, and 10D, the digital-to-analog converter 2124 may be common to a plurality of columns, for example, a plurality of signal lines L10 and L12. Alternatively, the digital-to-analog converter 2124 may be common to all the columns, for example, all the signal lines L10 and L12. Furthermore, the capacitors 21220 and 2128 are provided on at least one of the readout line side or the digital-to-analog converter 2124 side.

Figure 10E:
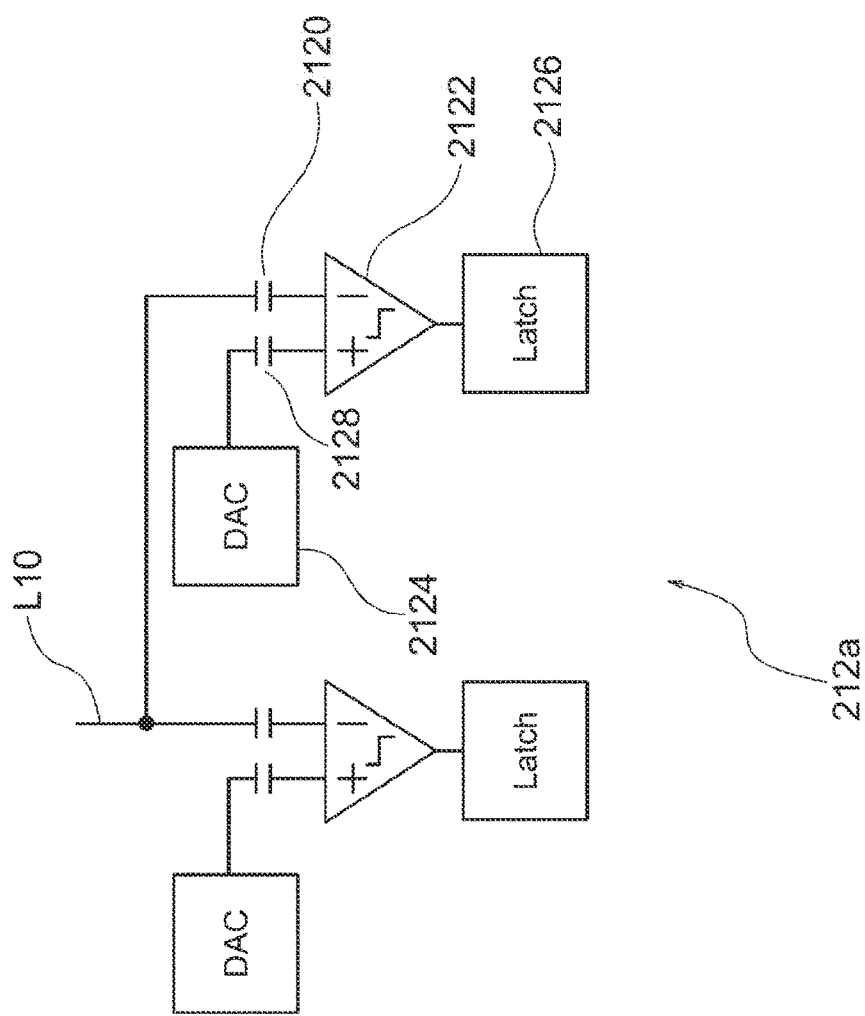
FIG. 10E is a diagram depicting an example in which a plurality of comparators is provided in one signal line.

FIG. 10E is a diagram depicting an example in which the plurality of comparators 2122 is provided in one signal line L10. As depicted in FIG. 10E, the event detection circuit 212a includes the plurality of comparators 2122, a plurality of digital-to-analog converters 2124, a plurality of signal holding circuits 2126, and a plurality of capacitors 2120 and 2128 connected to one signal line L10. By varying the values of the threshold value signals input from the plurality of digital-to-analog converters 2124, the on-event signal and the off-event signal can be simultaneously generated in each of the plurality of comparators 2122, and the on-event signal and the off-event signal can be held in each of the plurality of signal holding circuits 2126. In this manner, a plurality of comparators 212 may be provided in the one signal line L10. In this case, since the determination can be performed simultaneously with two or more threshold values, a high-speed operation can be performed.

Figure 11:
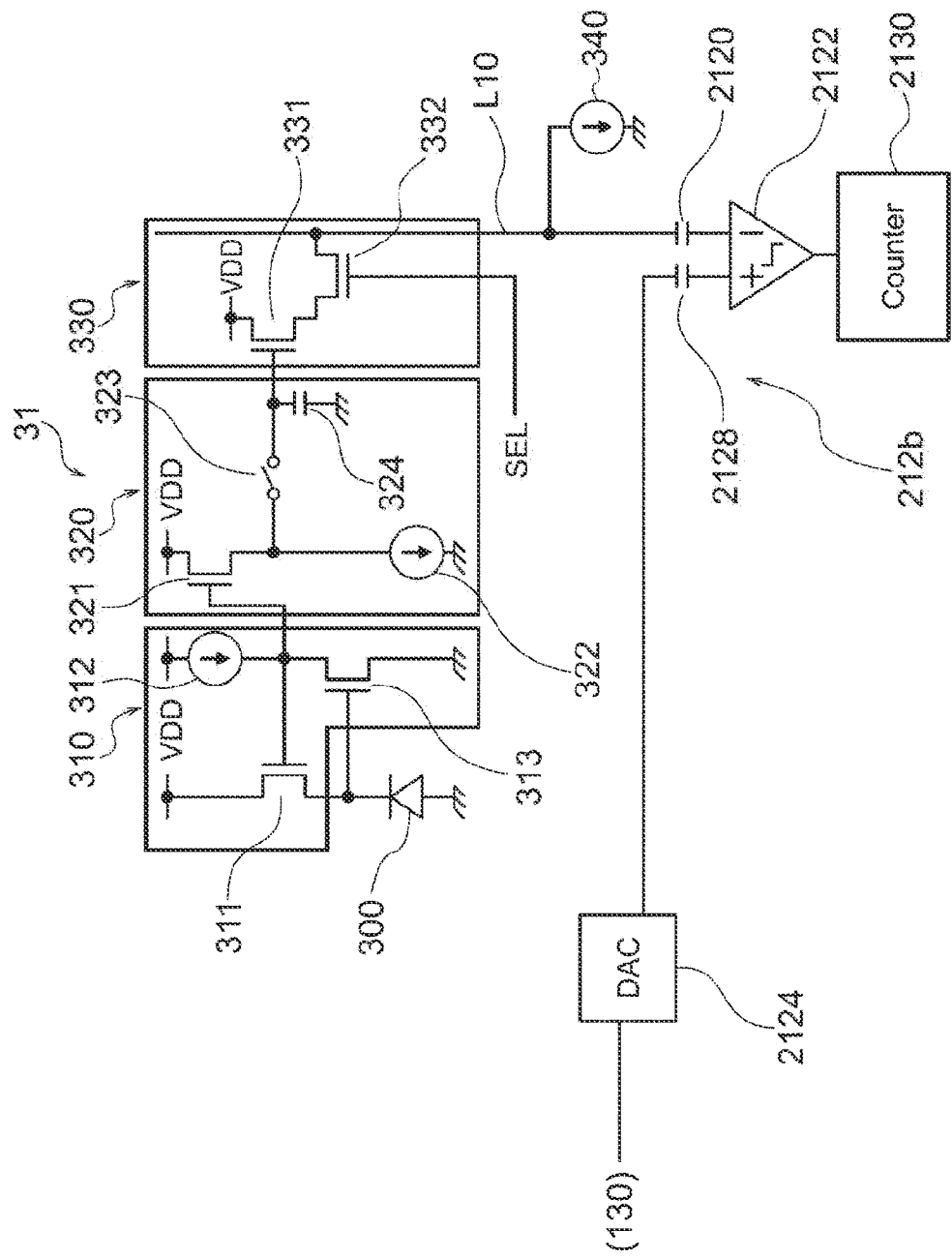
FIG. 11 is a diagram depicting an example in which the event detection circuit is formed by a single-slope ADC.

FIG. 11 is a diagram depicting an example in which an event detection circuit 212b is formed by a single-slope ADC. As depicted in FIG. 11, the event detection circuit 212b is different from the event detection circuit 212a (see FIG. 6) in including a counter circuit 2130 connected to an output terminal of the comparator 212. That is, the event detection circuit 212b is a circuit in which the event detection circuit a and an analog-to-digital conversion circuit (ADC) are common. This enables event detection of a luminance signal and analog-to-digital conversion.

Figure 12:
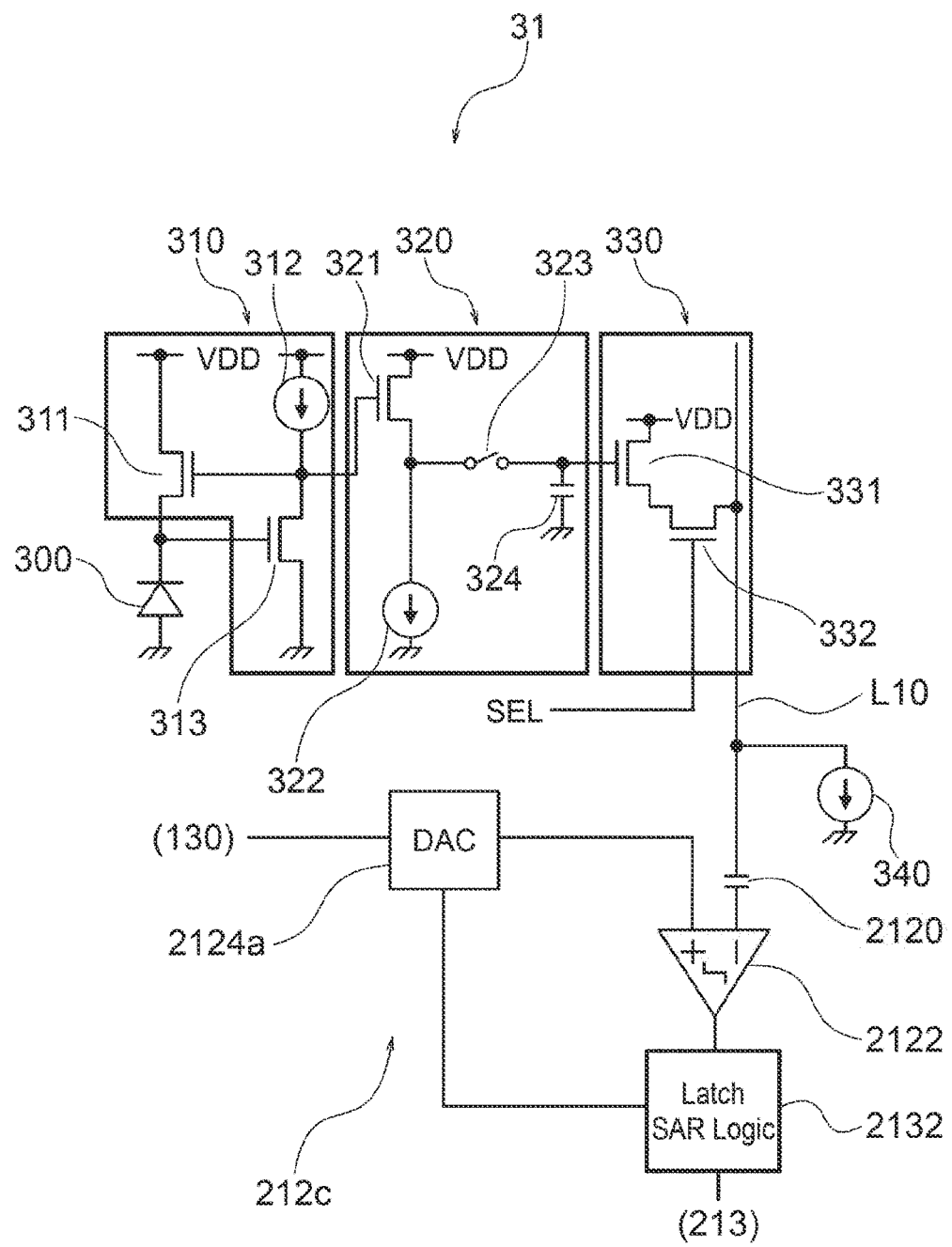
FIG. 12 is a diagram depicting an example in which the event detection circuit is formed by a SAR-ADC.

FIG. 12 is a diagram depicting an example in which the event detection circuit 212c is formed by a SAR-ADC. As depicted in FIG. 12, the event detection circuit 212c is different from the event detection circuit 212a (see FIG. 6) in including a latch and SAR logic circuit 2132 connected to the output terminal of the comparator 212. That is, the event detection circuit 212b is a circuit in which the event detection circuit a and an analog-to-digital conversion circuit (ADC) are common. This enables event detection of a luminance signal and analog-to-digital conversion. In addition, the DAC may be a capacitive DAC or a resistive DAC. Furthermore, the ADC may have other configurations. That is, it is sufficient if the ADC has a comparator, either of the two inputs has an input of capacitive coupling, and the threshold value can be adjusted. The SAR-ADC may also be referred to as successive approximation.

Figure 13:
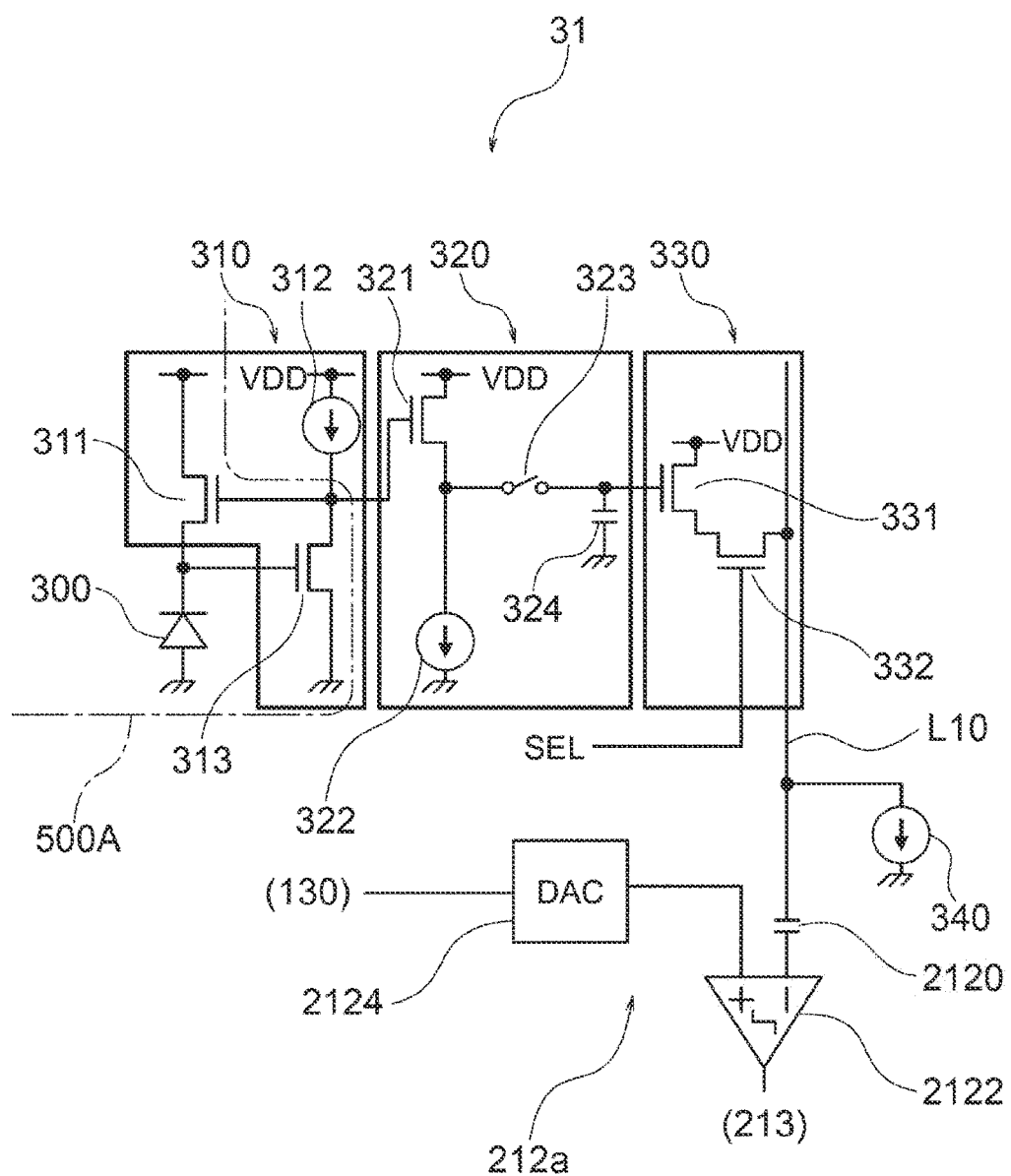
FIG. 13 is a diagram depicting an example in which a region and another region are formed by two chips.

FIG. 13 is a diagram depicting an example in which the region 500A and another region are formed by two chips. In a case where the pixel array section 30 is reduced in size, a technique of bonding two or more chips together is effective. Examples thereof include Cu—Cu, TSV, and microbumps.

Figure 14:
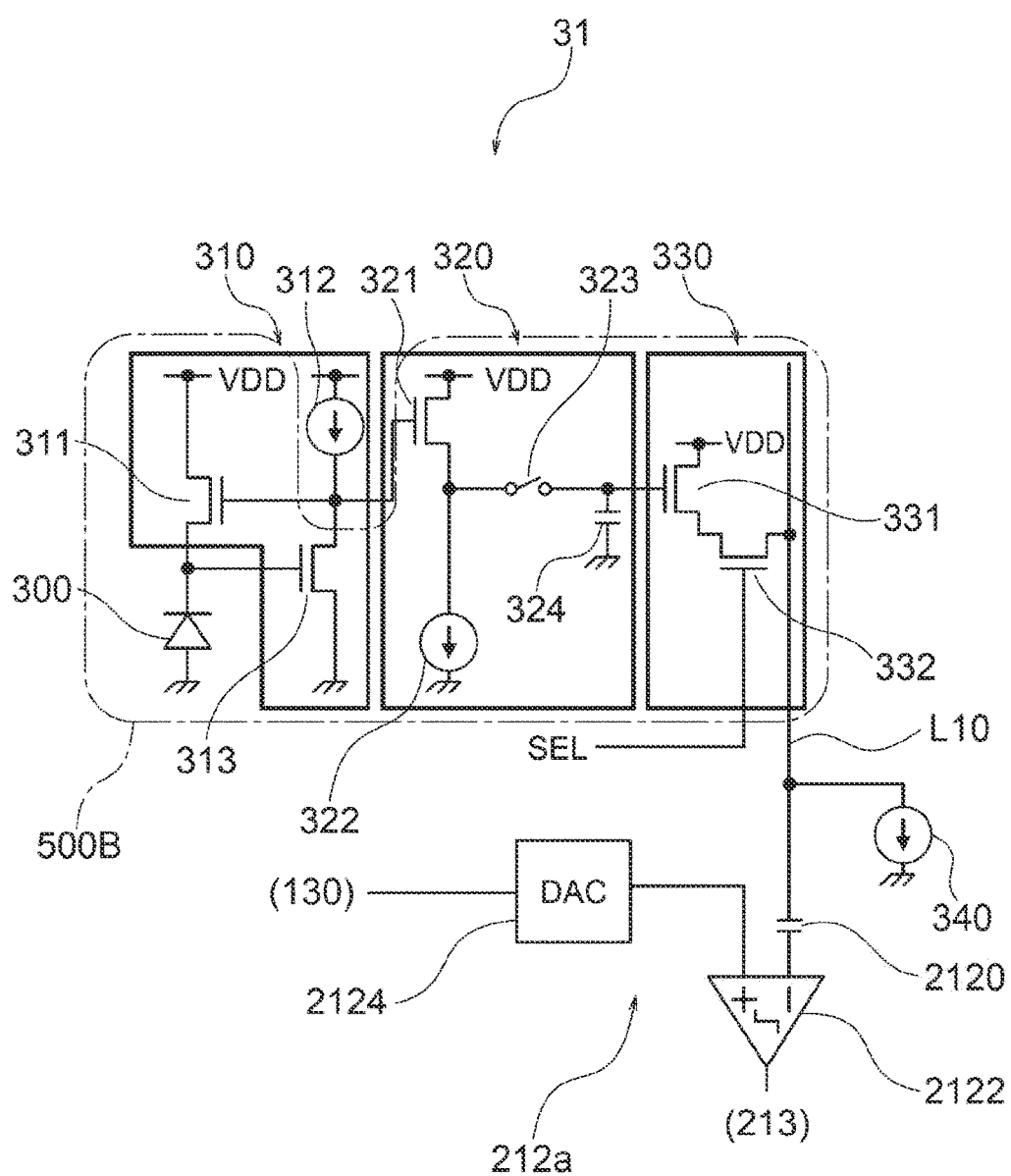
FIG. 14 is a diagram in which an NMOS or PMOS region is set as a region.

FIG. 14 is a diagram in which an NMOS or PMOS region is set as a region 500B. In a case where the PMOS and the NMOS are adjacent to each other, it is necessary to separate a WELL. Thus, disposing only the NMOS or the PMOS improves the disposing efficiency. Note that, in the example described above, the SW is formed by an NMOS and is not a CMOS (without a PMOS).

Figure 15:
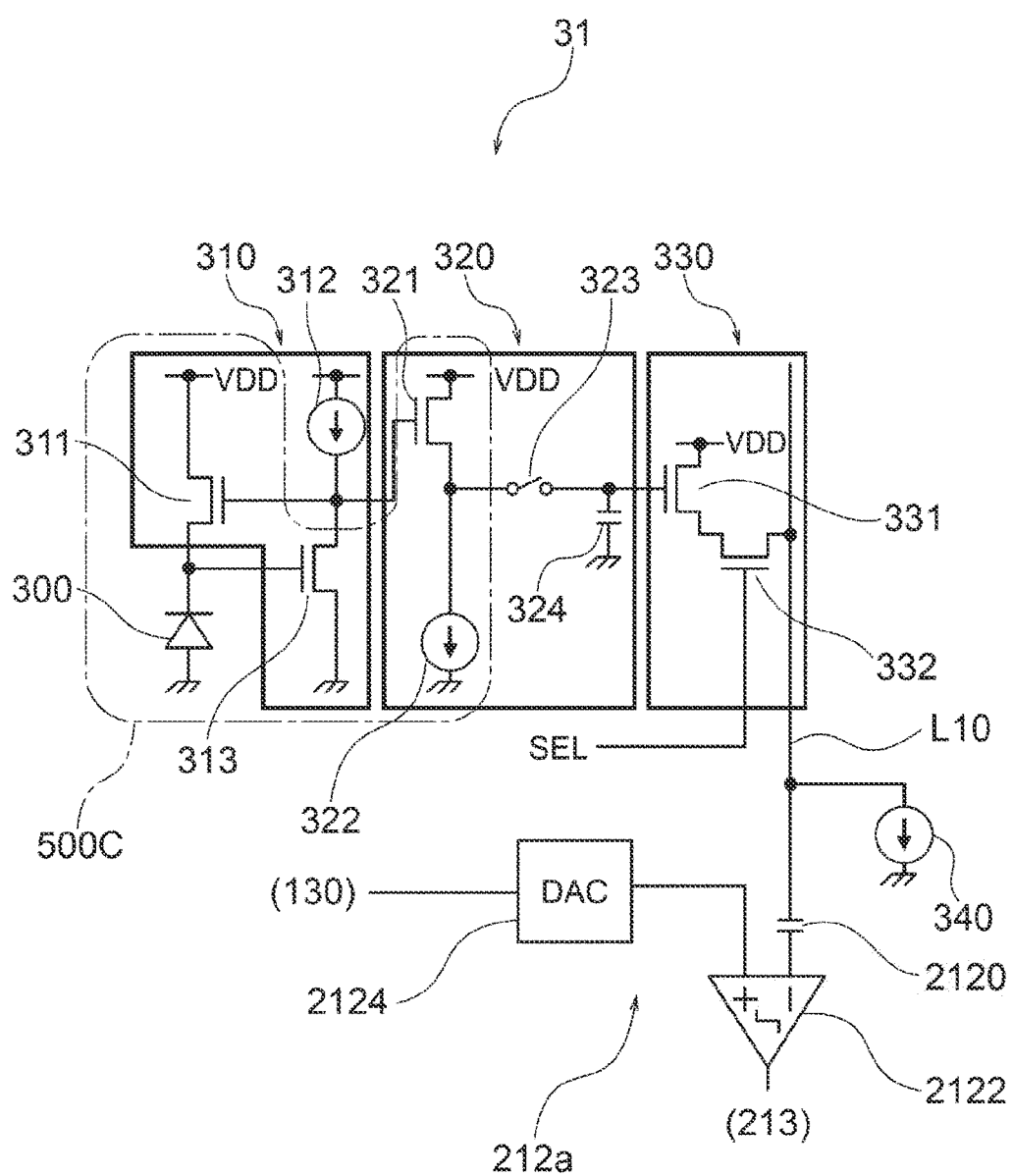
FIG. 15 is a diagram in which an NMOS is set as a region.

FIG. 15 is a diagram in which the NMOS is set as a region 500C. In a case where the PMOS and the NMOS are adjacent to each other, it is necessary to separate a WELL. As described above, the regions 500A to 500C can be divided in various ways.

Figure 16:
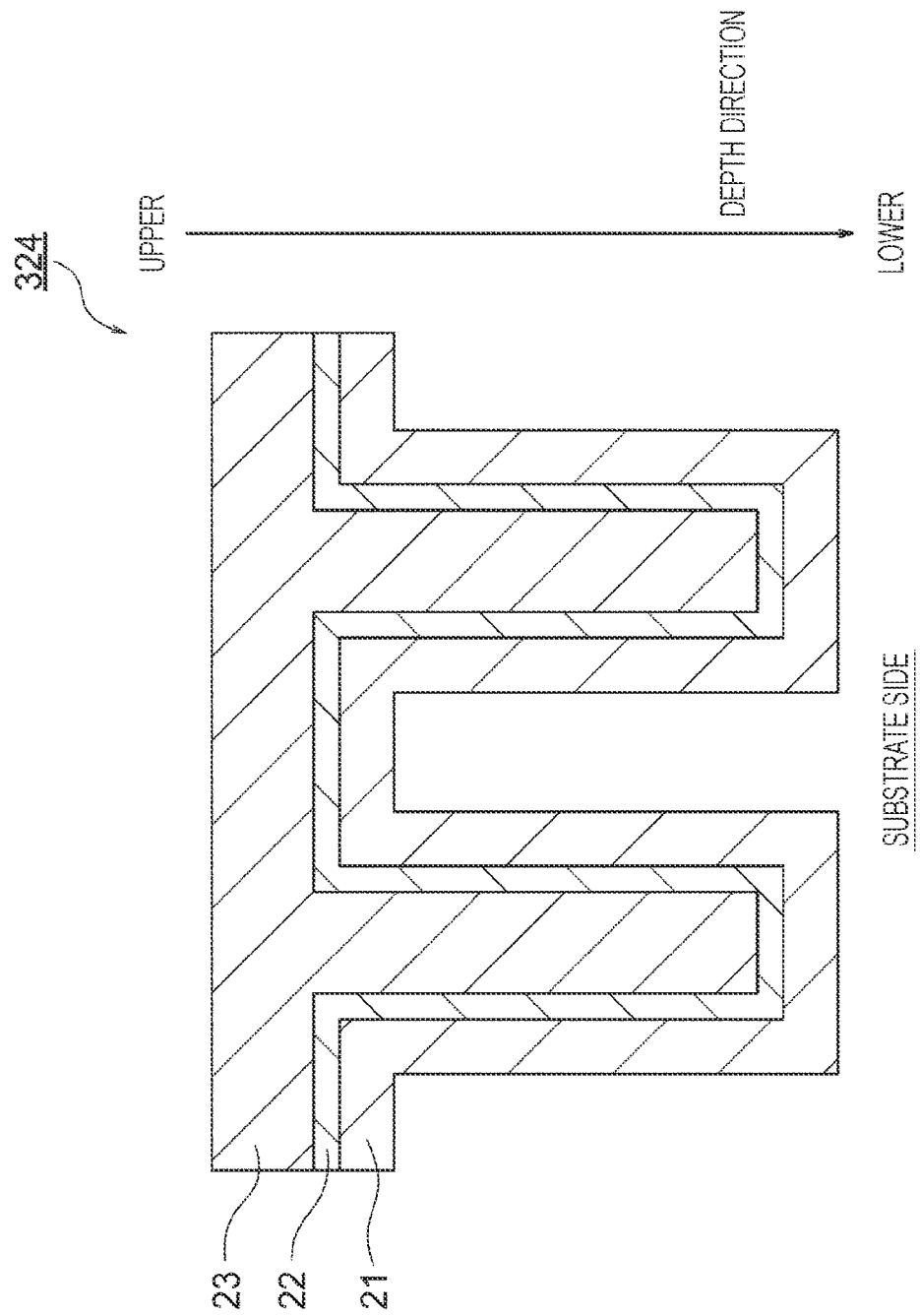
FIG. 16 is a cross-sectional view depicting a cross-sectional structure of a capacitor according to another example of the present embodiment.

FIG. 16 is a cross-sectional view depicting a cross-sectional structure of the capacitor 324 according to another example of the present embodiment. The capacitor 324 depicted in FIG. 16 is not a parallel plate capacitive element but a three-dimensional structure capacitive element. Specifically, the capacitor 324 includes a lower electrode 21, a dielectric layer 22, and an upper electrode 23.

As depicted in FIG. 16, the interface between the lower electrode 21 and the dielectric layer 22 has a trench shape recessed in a direction from the upper electrode 23 toward the lower electrode 21, that is, in a depth direction. The dielectric layer 22 is provided with a substantially uniform film thickness along the trench shape. In the example depicted in FIG. 2, the lower electrode 21 is also provided with a substantially uniform film thickness along the trench shape. The upper electrode 23 has a substantially flat upper surface and a lower surface provided along the trench shape. Thus, a region where the upper electrode 23 and the lower electrode 21 face each other increases in the side surface portion of the groove in the trench shape. Accordingly, the surface area of the capacitive element 20 increases, and the capacitor increases.

The lower electrode 21 is formed using a conductive material. As the conductive material, a simple metal such as titanium (Ti), aluminum (Al), gold (Au), or platinum (Pt) is used. Alternatively, as the conductive material, a conductive metal nitride film such as titanium nitride (TiN, tantalum nitride (TaN), or hafnium nitride (HfN) may be used. In addition, as the conductive material, a conductive oxide such as indium tin oxide (ITO) or zinc oxide (ZnO) may be used. The upper electrode 23 may be formed using the same material as the lower electrode 21, or may be formed using a different material. The dielectric layer 22 is formed using a high-k material having a dielectric constant higher than that of silicon oxide ($SiO_2$). Specifically, the dielectric layer 12 contains an oxide of hafnium (Hf) or zirconium (Zr) as a main component. The dielectric layer 12 contains 50 mol % or more of an oxide of hafnium or zirconium.

Note that, in FIG. 16, the trench shape having two grooves is depicted as an example, but the number of grooves may be one or three or more. Furthermore, by increasing the number of grooves or making the grooves deeper, the capacitor of the capacitor 324 can be increased.

Figure 17:
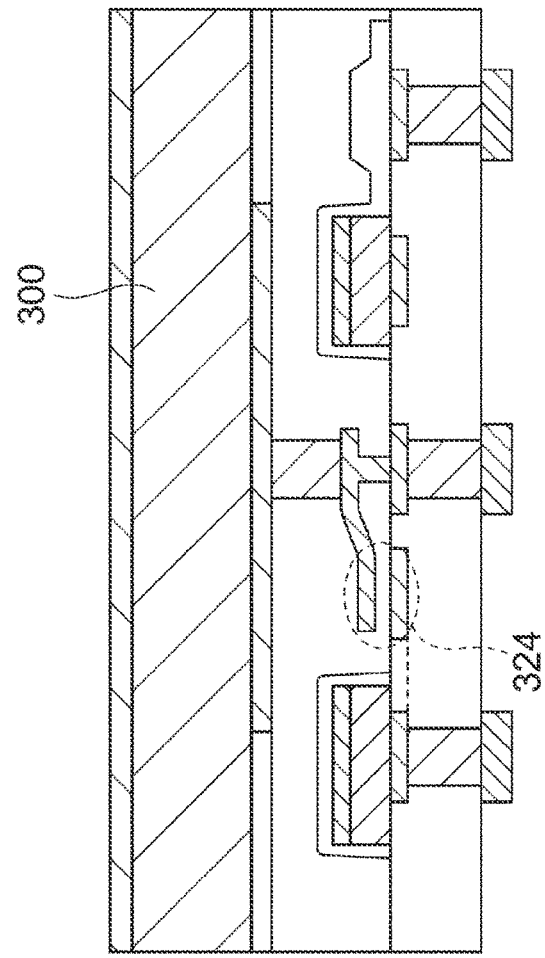
FIG. 17 is a cross-sectional view depicting a cross-sectional structure of a flat plate capacitor according to another example of the present embodiment.

FIG. 17 is a cross-sectional view depicting a cross-sectional structure of a flat plate capacitor 324 according to another example of the present exemplary embodiment. The capacitor 324 depicted in FIG. 17 is a capacitor element that accumulates signal charges extracted from the photoelectric conversion element 300. In this manner, the capacitor 324 may be formed in a flat plate shape.

Figure 18:
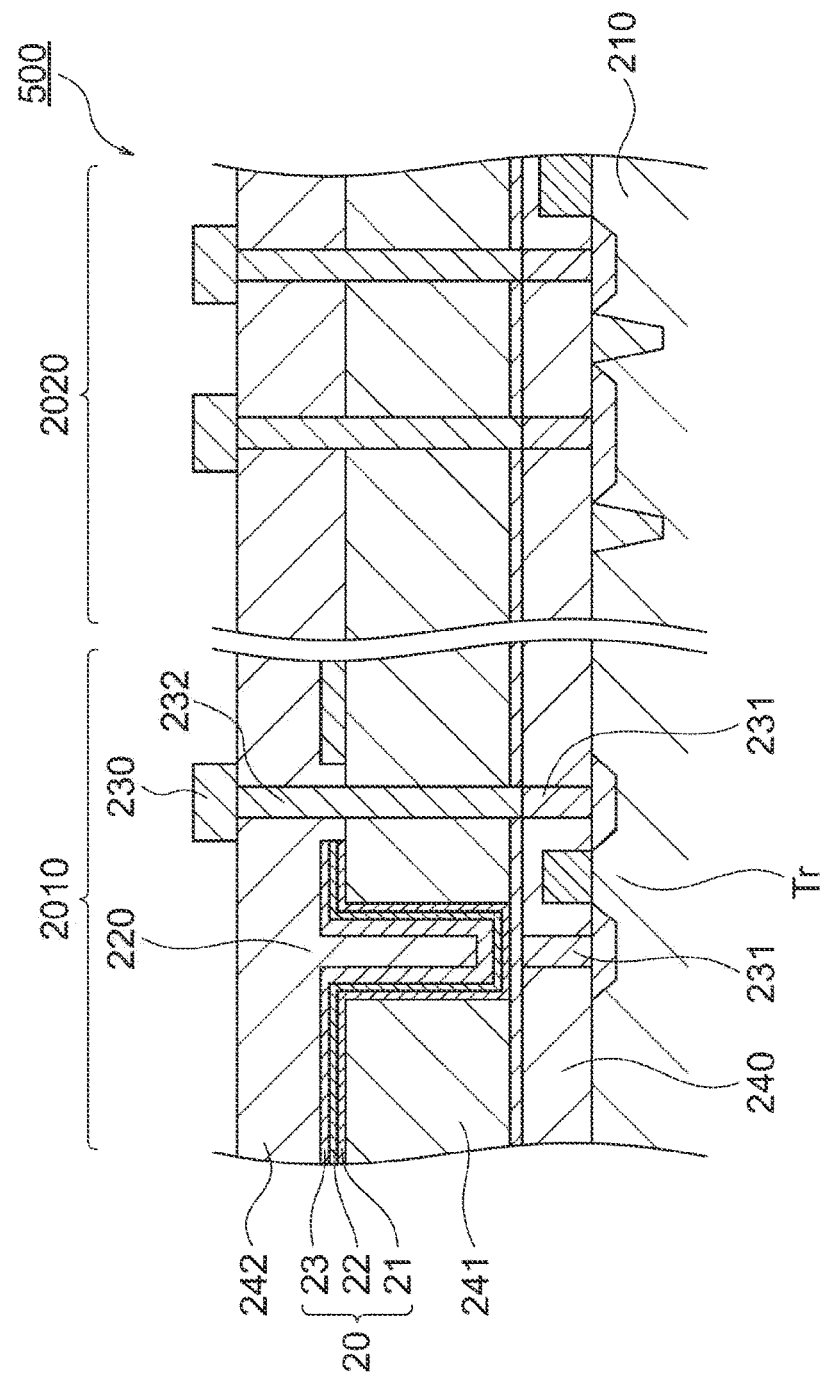
FIG. 18 is a cross-sectional view depicting a cross-sectional structure of a memory device according to the present embodiment.

FIG. 18 is a cross-sectional view depicting a cross-sectional structure of another memory device 600A according to the present embodiment. The memory device 600A is, for example, a storage device such as an embedded dynamic random access memory (eDRAM). Note that a capacitor 343 is not limited to the eDRAM as long as it is a capacitor-based storage device.

As depicted in FIG. 18, the memory device 600A according to the present embodiment includes a DRAM formation region 2010 and a logic circuit formation region 2020 on a substrate 210. In the DRAM formation region 2010, a memory cell 220, a transistor Tr, and a wiring layer 230 are provided.

In the memory device 600A, for example, a plurality of DRAM formation regions 2010 and a plurality of logic circuit formation regions 2020 are arranged in a matrix. A value can be held by writing a charge to the memory cell 220 included in the DRAM formation region 201. The substrate 210 is a semiconductor substrate, for example, an Si substrate. A plurality of insulating films 240, 241, and 242 is sequentially stacked on the substrate 210.

The memory cell 220 is, for example, the capacitor 343 depicted in FIG. 6. The memory cell 220 is provided on the insulating film 241 formed on the substrate 210. Specifically, the insulating film 241 is provided with a through hole for exposing the upper surface of the insulating film 240, and the memory cell 220 has a trench structure using the through hole.

The lower electrode 21 of the memory cell 220 is connected to one of the source and the drain of the transistor Tr via a contact plug 231 penetrating the insulating film 240. The memory cell 220 accumulates the charge supplied via the transistor Tr.

The transistor Tr writes or reads electric charge to or from the memory cell 220. The transistor Tr is, for example, a MOSFET. The source, the drain, and the like of the transistor Tr are formed in a surface region of the substrate 210. The other of the source and the drain of the transistor Tr is connected to the wiring layer 230 via the contact plug 231 penetrating the insulating film 240 and the contact plug 232 penetrating the insulating films 241 and 242.

Figure 19C:
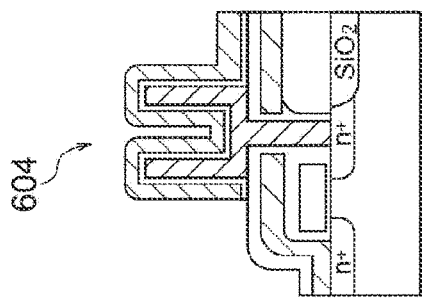
FIGS. 19A, 19B, 19C, 19D, and 19E are diagrams depicting an example of a tack cell applicable to a capacitor 343 depicted in FIG. 6.
Figure 19B:
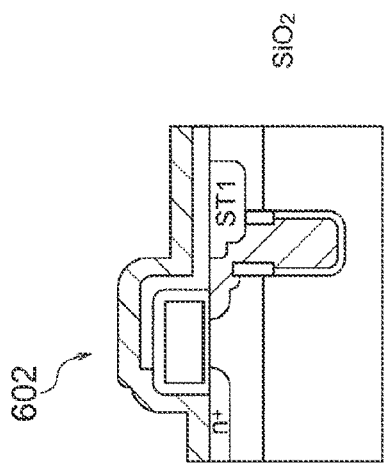
Figure 19E:
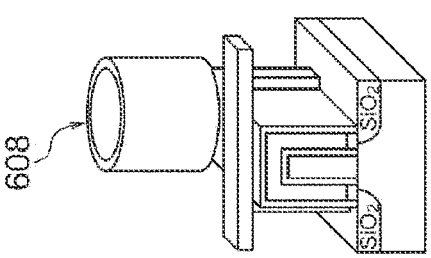
Figure 19A:
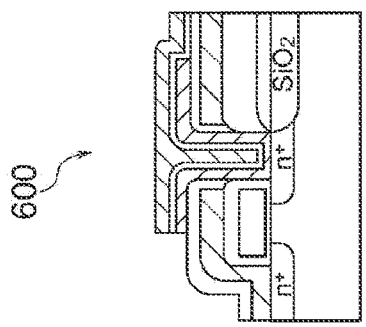
Figure 19D:
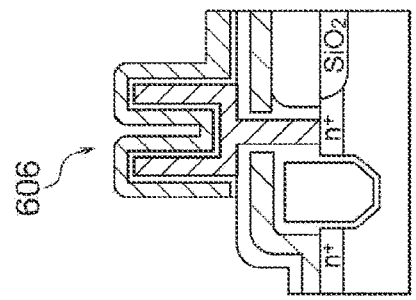

FIGS. 19A, 19B, 19C, 19D, and 19E are diagrams depicting an example of a stack cell applicable to the capacitor 343 depicted in FIG. 6. FIG. 19A is a diagram depicting a cross-sectional structure of a capacitance over bit-line (COB) stack cell 600. FIG. 19B is a diagram depicting a cross-sectional structure of a substrate plate trench cell 602. FIG. 19C is a cross-sectional view of a cylindrical stack cell 604. FIG. 19D is a diagram depicting a cross-sectional view of a cylindrical stack cell 606 using a recessed channel transistor. FIG. 19E is a diagram depicting a cross-sectional view of a cylindrical stack cell 608 using a fin-type transistor. These stack cells can be used for the capacitor 343 depicted in FIG. 6.

Figure 20:
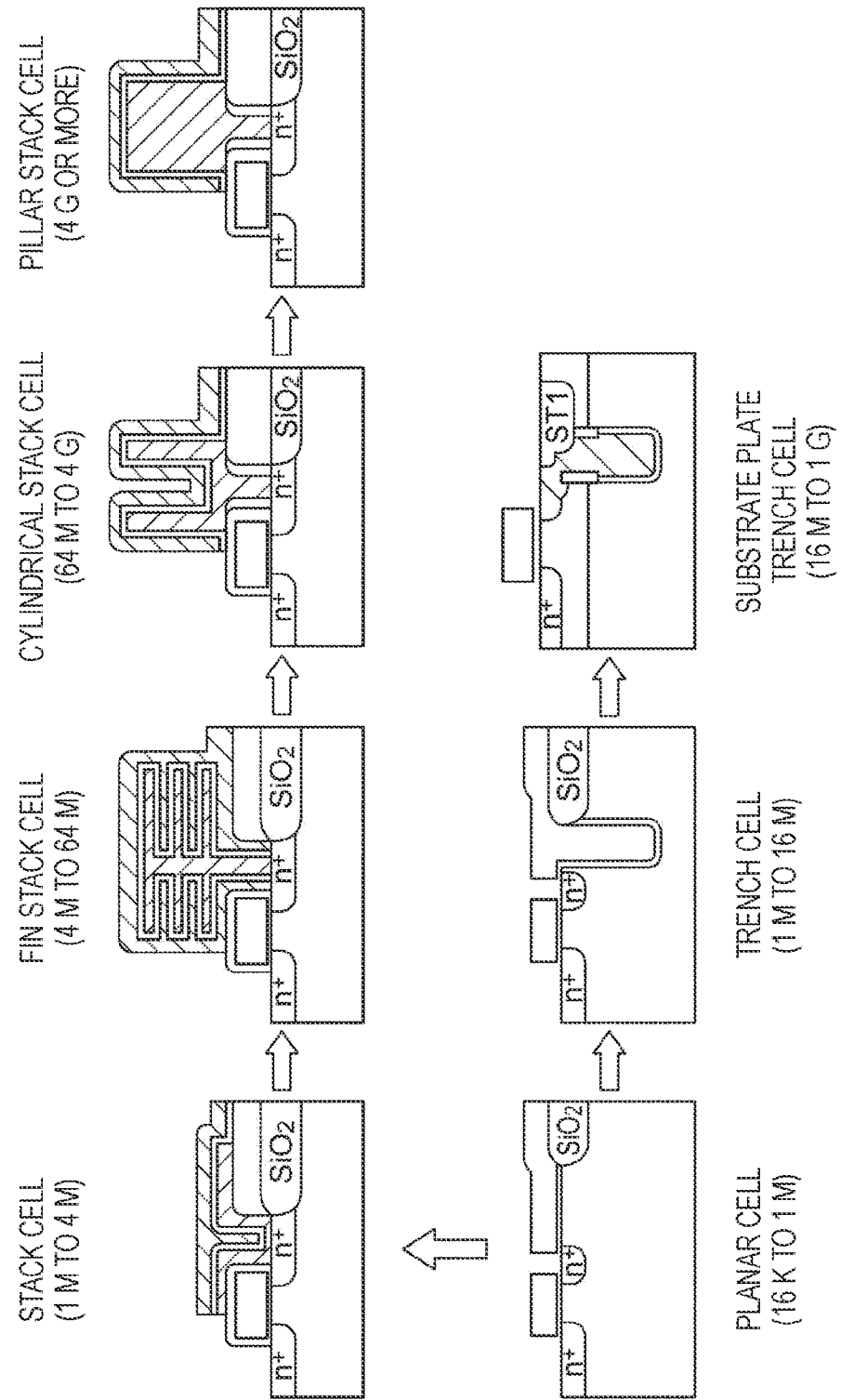
FIG. 20 is a diagram depicting a transition example of the stack cell depicted in FIGS. 19A, 19B, 19C, 19D, and 19E.

FIG. 20 is a diagram depicting a transition example of the stack cell depicted in FIGS. 19A, 19B, 19C, 19D, and 19E. As depicted in FIGS. 19A, 19B, 19C, 19D, and 19E, the capacity of the planar cell is 10 K to 1 M bits, and the capacity increases to 1 M to 16 M bits and 16 M to 1 G bits as it transitions to a trench cell and a substrate plate trench cell. On the other hand, as the stack cell, as it transitions to a fin stack cell, a cylindrical stack cell, and a pillar stack cell, the capacity increases to 1 M to 4 M bits, 4 M to 64 M bits, 64 M to 4 G bits, and 4 G bits or more. These stack cells can be used for the capacitor 343 depicted in FIG. 6.

As described above, the imaging device 100 according to the first embodiment includes the detection circuit section 212 that is disposed outside the pixel array section 30 and outputs a detection signal indicating the occurrence of the address event in a case where the luminance signal of each of the plurality of DVS pixels exceeds a predetermined threshold value. Thus, since the detection circuit section 212 is disposed outside the pixel array section 30, the pixel array section 30 can be downsized. Furthermore, since the signal holding circuit 323 of the DVS pixel 31 holds a luminance signal converted by the logarithmic conversion circuit 320, the luminance signal is input to the comparator 2122 via the capacitively coupled capacitor 2120, the initial first luminance signal is input after the capacitor 2120 is initialized, and the second luminance signal held in the signal holding circuit 323 is subsequently input, and an event signal can be generated.

Modification 1 of First Embodiment

While the mode imaging device 100 according to a first implementation form performs logarithmic conversion of the output signal of the photoelectric conversion element 300, the mode imaging device 100 according to Modification 1 of the first embodiment is different from the mode imaging device 100 according to the first implementation form in further including a circuit configuration capable of linearly outputting the output signal of the photoelectric conversion element 300. Hereinafter, differences from the mode imaging device 100 according to the first embodiment will be described.

Figure 21:
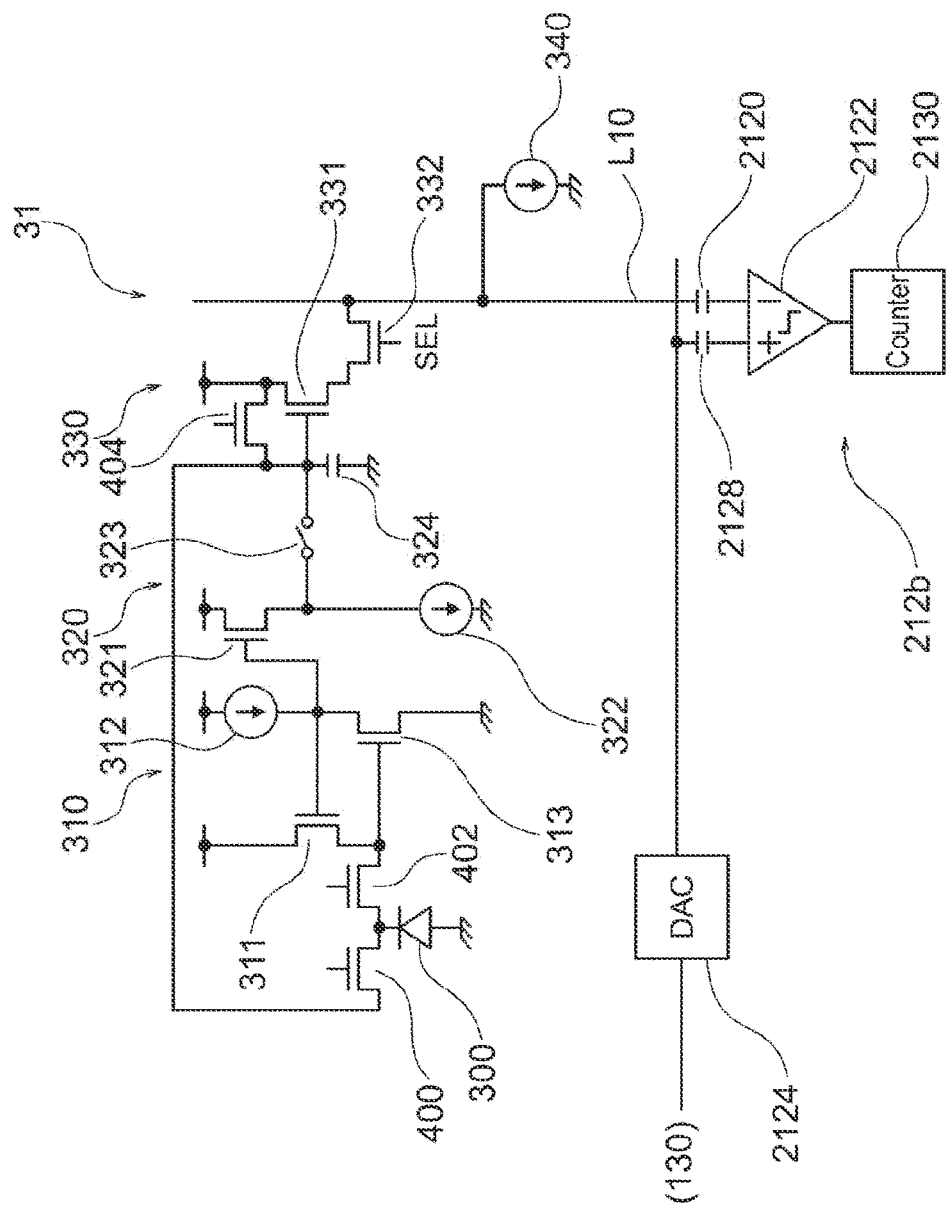
FIG. 21 is a diagram depicting a configuration example of a DVS pixel and an event detection circuit.

FIG. 21 is a diagram depicting a configuration example of the DVS pixel 31 and the event detection circuit 212b. As depicted in FIG. 21, the DVS pixel 31 is different from the DVS pixel 31 depicted in FIG. 11 in further including switching elements 400.402 and a reset transistor 404.

One end of the switching element 400 is connected to an anode of the photoelectric conversion element 300. The other end of the switching element 400 is connected to the one end of the capacitor 324. Furthermore, one end of the switching element 402 is connected to the anode of the photoelectric conversion element 300. The other end of the switching element 402 is connected to the gate of the N-type transistor 313. One end of the reset transistor 404 is connected to the power supply terminal VDD, and the other end is connected to the one end of the capacitor 324.

As depicted in FIG. 21, the reset transistor 404 is brought into a disconnected state (OFF), and the switching element 400 is brought into a disconnected state (OFF). Then, in a case where the switching element 402 is brought into a connected state (ON), a luminance signal equivalent to that of the DVS pixel 31 depicted in FIG. 11 can be output.

On the other hand, the switching element 400 is brought into a connected state (ON). Then, in a case where the switching element 402 is brought into a disconnected state (OFF), a charge proportional to an output voltage of the photoelectric conversion element 300 is added to the capacitor 324. In this case, the switching elements 400, 402, and 323 are brought into a disconnected state (OFF), the reset transistor 404 is brought into a connected state (ON), and the accumulated charge in the capacitor 324 is set to an initial state.

Thus, a signal proportional to the output voltage of the photoelectric conversion element 300 can be analog-to-digital converted by the event detection circuit 212b. Moreover, the charge corresponding to the pixel voltage Vsh1 can be accumulated in the capacitor 324, and the charge corresponding to the element voltage Vsh2 can be accumulated at the next timing. Thus, the event detection circuit 212b can compare a difference value (pixel voltage Vsh2−pixel voltage Vsh1) between the pixel voltage Vsh2 and the pixel voltage Vsh1 with the threshold value. As described above, the output of the photoelectric conversion element 300 may be separated in two directions by the switching elements 400.402. It is possible to directly connect to the logarithmic conversion circuit 310 and the sample and hold circuit 320. That is, in a case where it is connected to the logarithmic conversion circuit 310, the signal can be read as an event (Even) signal. Note that, in a case where a column circuit is used in combination with the ADC, it is also possible to read out a difference between the previous and current signals as gradations.

Furthermore, in a case where a charge according to the output of the electric conversion element 300 is directly supplied to the capacitor 324 of the sample and hold circuit 320, it is possible to cause a motion equivalent to that of a general image sensor. In this case, similarly to reading of the event (Even) signal, it is possible to compare the difference between the previous information and the current information using a linear signal. In this case, it is possible to select whether the current signal is added and read or reset and read after AZ with the previous signal.

Modification 2 of First Embodiment

The mode imaging device 100 according to Modification 2 of the first embodiment is different from the mode imaging device 100 according to Modification 1 of the first embodiment in further including a floating capacitor 408 different from the capacitor 324 in a case where the linear output of the photoelectric conversion element 300 is held. Hereinafter, differences from the mode imaging device 100 according to Modification 1 of the first embodiment will be described.

Figure 22:
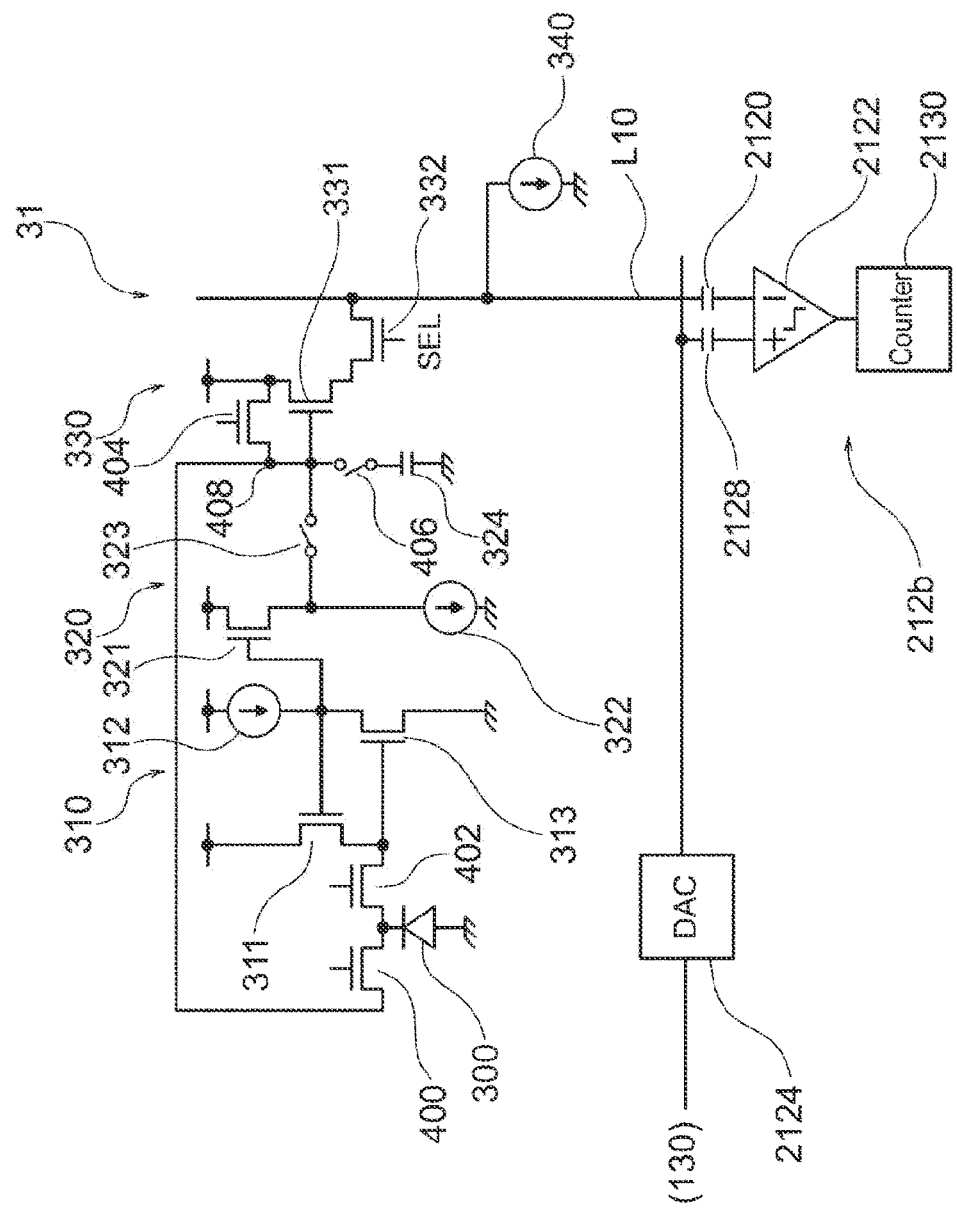
FIG. 22 is a diagram depicting a configuration example of the DVS pixel and the event detection circuit according to Modification 2 of the first embodiment.

FIG. 22 is a diagram depicting a configuration example of the DVS pixel 31 and the event detection circuit 212b according to Modification 2 of the first embodiment. As depicted in FIG. 22, the DVS pixel 31 is different from the DVS pixel 31 indicated by 20 in further including a switching element 406.

In the case of linearly outputting the output of the photoelectric conversion element 300, first, the switching elements 323, 400.402.406 are set to a connected state (ON). Then, the set transistor 404 is brought into a connected state (ON), and the stored charge of the floating capacitor 408 is brought into an initial state.

Next, the switching element 400 is brought into a connected state (ON), and a charge corresponding to the output of the electric conversion element 300 is directly supplied to the floating capacitor 408. The floating capacitor 408 outputs the accumulated charge as a voltage signal. Other processing is equivalent to that of the mode imaging device 100 according to Modification 1 of the first embodiment. As described above, in a case where the event signal is read, the capacitor 324 having a capacitor larger than that of the floating capacitor 408 is used. On the other hand, in a case where a gradation signal is read, the smaller floating capacitor 408 is used as the capacitor. In this manner, the floating capacitor 408 and the capacitor 324 can be separated according to the event signal and the gradation signal.

Modification 3 of First Embodiment

The mode imaging device 100 according to Modification 3 of the first embodiment is different from the mode imaging device 100 according to Modification 2 of the first embodiment in further including a readout circuit 330a that outputs a linear output of the photoelectric conversion element 300. Hereinafter, differences from the mode imaging device 100 according to Modification 1 of the first embodiment will be described.

Figure 23:
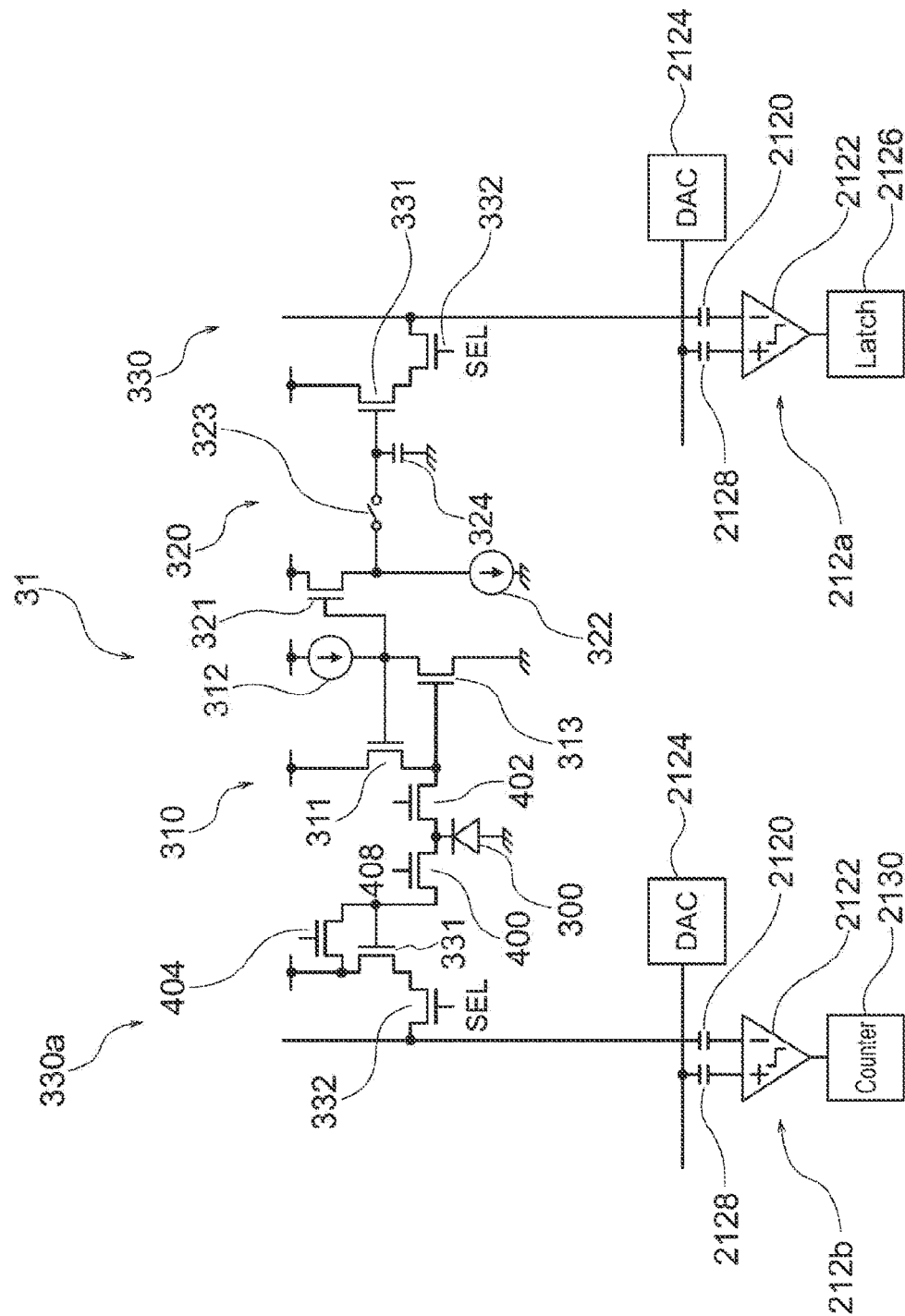
FIG. 23 is a diagram depicting a configuration example of the DVS pixel and the event detection circuit according to Modification 2 of the first embodiment.

FIG. 23 is a diagram depicting a configuration example of the DVS pixel 31 and the event detection circuit 212b according to Modification 2 of the first embodiment. As depicted in FIG. 23, the DVS pixel 31 is different from the mode imaging device 100 according to Modification 2 of the first embodiment in further including the readout circuit 330a.

The event detection circuit 212b is connected to the readout circuit 330a side. Thus, it is possible to perform analog-digital conversion on a signal linearly proportional to the output of the photoelectric conversion element 300. On the other hand, it is also possible to detect an event by a signal linearly proportional to the output of the photoelectric conversion element 300.

On the other hand, the event detection circuit 212a is connected to the readout circuit 330 side. Thus, it is also possible to detect an event by a signal obtained by logarithmically converting the output of the photoelectric conversion element 300.

Modification 4 of First Embodiment

The mode imaging device 100 according to Modification 4 of the first embodiment is different from the mode imaging device 100 according to the first embodiment in that the pixel array section 30 includes a gradation pixel (Nomal) 32. Hereinafter, differences from the mode imaging device 100 according to the first embodiment will be described.

Figure 24:
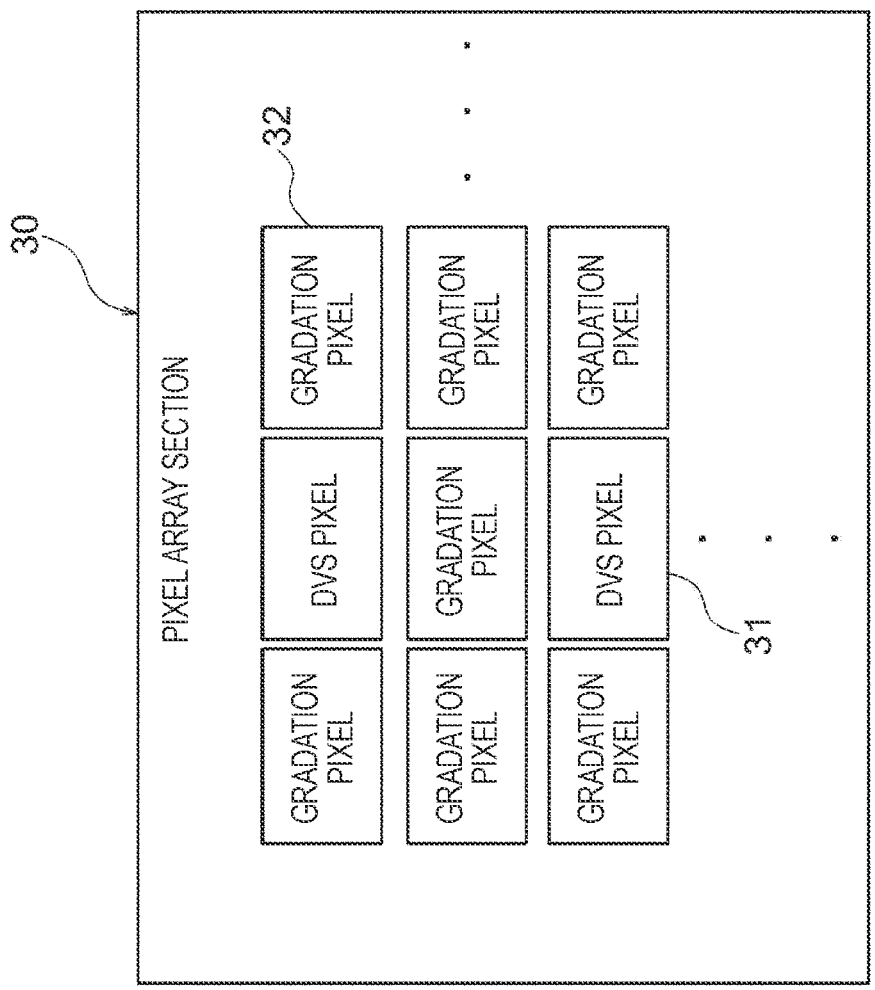
FIG. 24 is a diagram depicting a configuration example of a pixel array section according to Modification 4 of the first embodiment.

FIG. 24 is a diagram depicting a configuration example of a pixel array section 30 according to Modification 4 of the first embodiment. As depicted in FIG. 24, the pixel array section 30 is different from the mode imaging device 100 according to the first embodiment in including a plurality of DVS pixels 31 and a plurality of gradation pixels (Nomal) 32.

Figure 25:
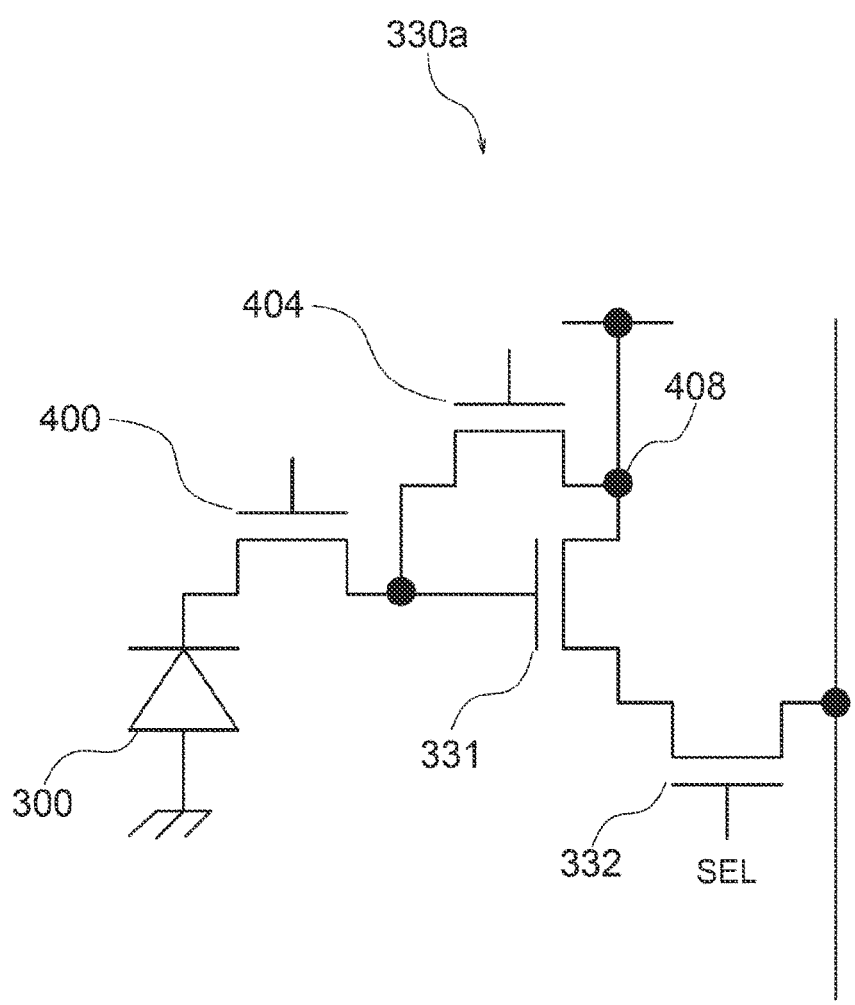
FIG. 25 is a diagram depicting a configuration example of a gradation pixel.

FIG. 25 is a diagram depicting a configuration example of the gradation pixel (Nomal) 32. As depicted in FIG. 25, the gradation pixel (Nomal) 32 includes the readout circuit 330a (see FIG. 22). As described above, the gradation pixel (Nomal) 32 outputs a signal linearly proportional to the output of the photoelectric conversion element 300.

<Application Example of Technology According to Present Disclosure>

The technology according to the present disclosure can be applied to various products. Hereinafter, a more specific application example will be described. For example, the technology according to the present disclosure may be achieved as a distance measuring device mounted on any type of mobile body such as an automobile, an electric vehicle, a hybrid electric vehicle, a motorcycle, a bicycle, a personal mobility, an airplane, a drone, a ship, a robot, a construction machine, a farm machine (tractor), and the like.

[Mobile Body]

Figure 26:
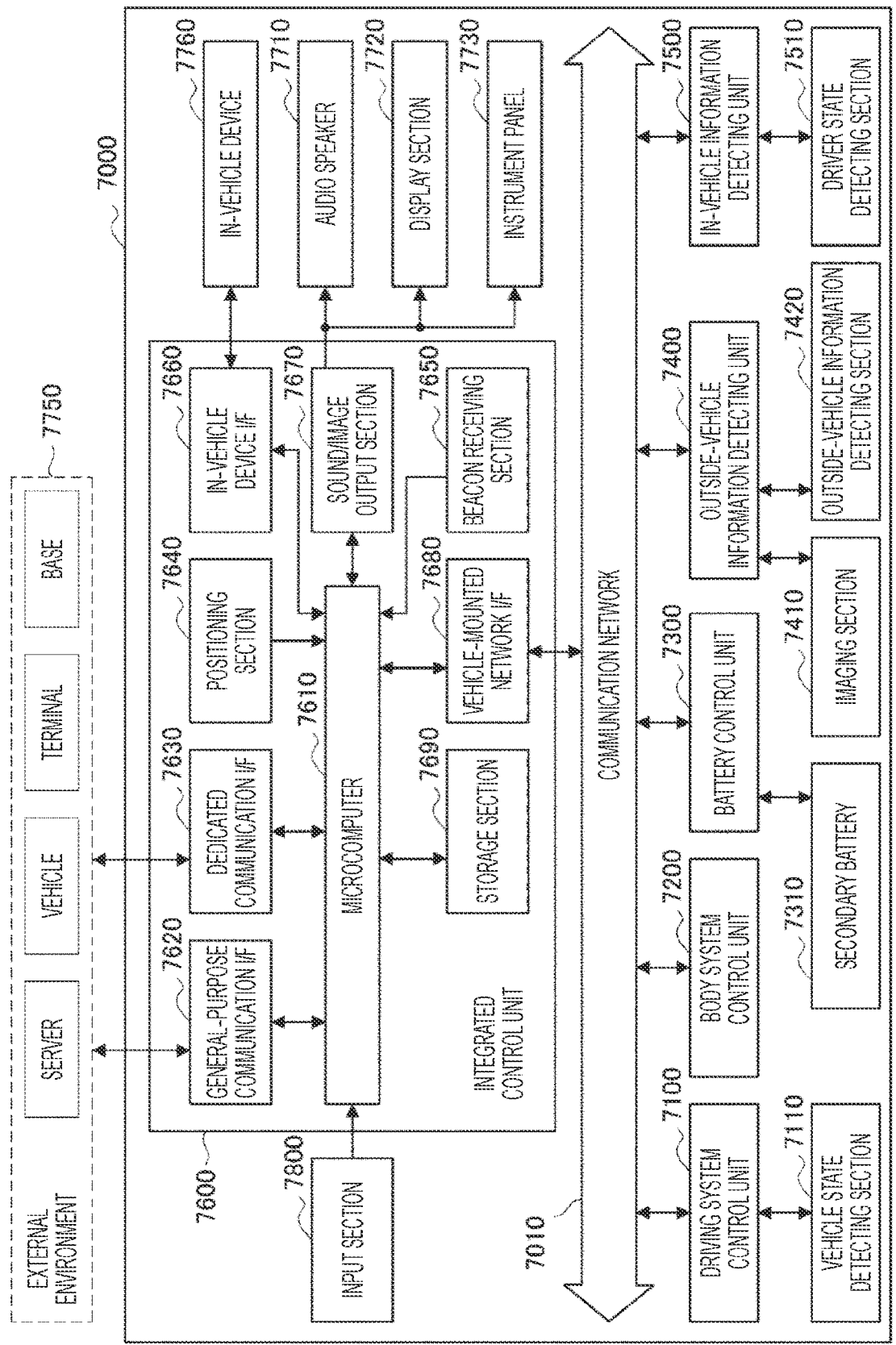
FIG. 26 is a block diagram depicting a schematic configuration example of a vehicle control system as an example of a mobile body control system to which the technology according to the present disclosure can be applied.

FIG. 26 is a block diagram depicting a schematic configuration example of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 26, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 27 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 27:
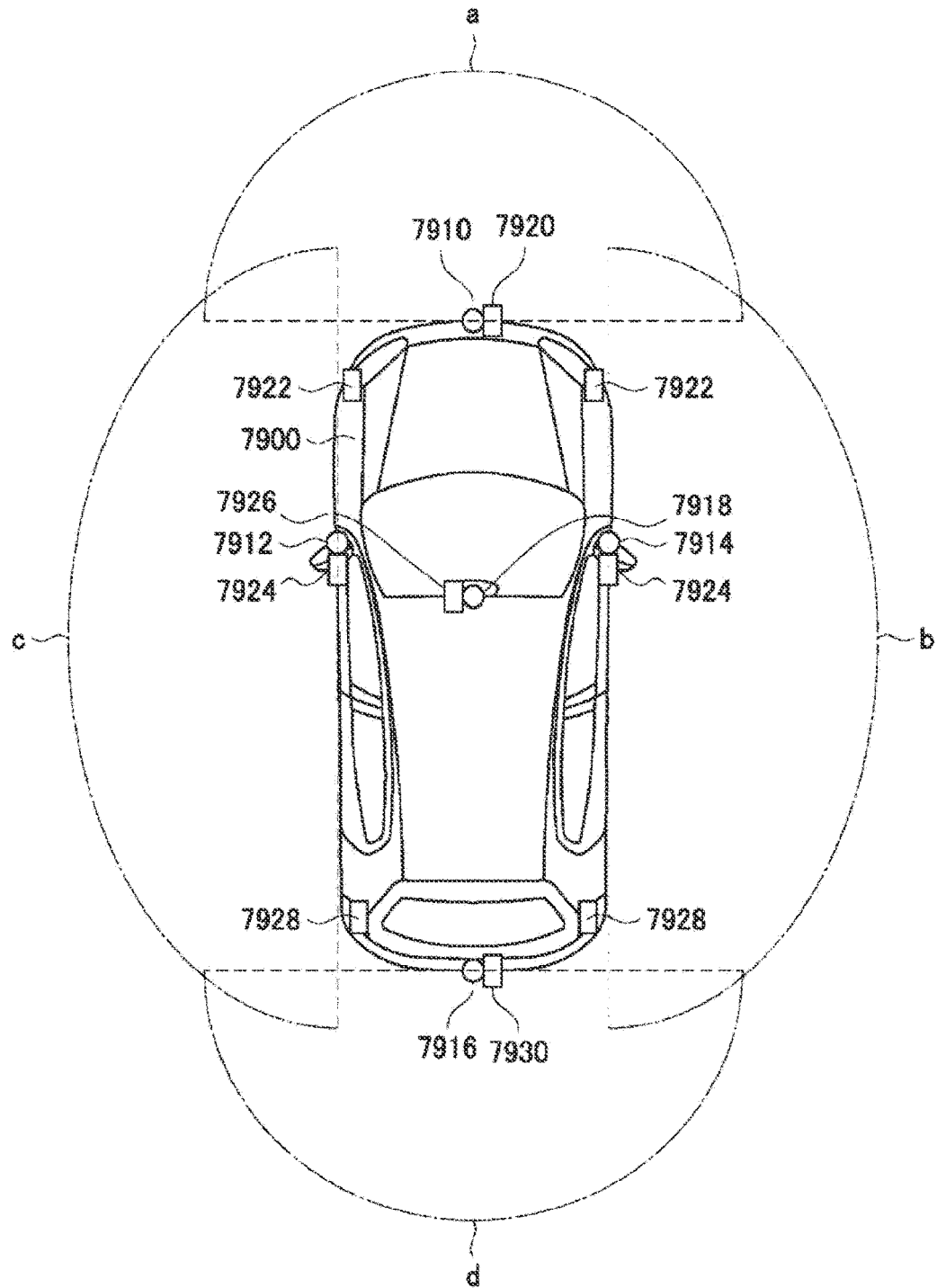
FIG. 27 is a diagram depicting an example of installation positions of an imaging section and an outside-vehicle information detecting section.

FIG. 27 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 27 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 26, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system of mobile communications (GSM (registered trademark)), WiMAX, long term evolution (LTE), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or to the outside of the vehicle. In the example of FIG. 24, an audio speaker 7710, a display section 7720, and an instrument panel 7730 are depicted as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 26 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

The example of the vehicle control system to which the technology according to the present disclosure can be applied has been described above. The technology according to the present disclosure can be applied to, for example, the imaging sections 7910, 7912, 7914, 7916, and 7918, the outside-vehicle information detecting sections 7920, 7922, 7924, 7926, 7928, and 7930, the driver state detecting section 7510, and the like, among the above-described configurations. Specifically, the imaging system 10 in FIG. 1 including the imaging device of the present disclosure can be applied to these imaging sections and detection sections. Then, by applying the technology according to the present disclosure, the influence of a noise event such as sensor noise can be mitigated, and the occurrence of a true event can be reliably and quickly sensed, so that safe vehicle traveling can be achieved.

Note that the present technology can have configurations as follows.

(1) An imaging device, including:
  a pixel array section including a plurality of dynamic vision sensor (DVS) pixels that outputs a luminance signal according to a light amount; and
  a detection circuit section that is disposed outside the pixel array section and outputs a detection signal indicating occurrence of an address event in a case where the luminance signal of each of the plurality of DVS pixels exceeds a predetermined threshold value, in which
  the DVS pixel includes
  a photoelectric conversion element that outputs a signal corresponding to a light amount,
  a logarithmic conversion circuit that logarithmically converts the signal,
  a signal holding circuit that holds the luminance signal converted by the logarithmic conversion circuit, and
  a readout circuit that reads the luminance signal held in the signal holding circuit.

(2) The imaging device according to (1), in which
  the detection circuit section includes at least one comparator, and
  a reference generation circuit that outputs a reference voltage, and
  a luminance signal read from the readout circuit and the reference voltage are input to the comparator.

(3) The imaging device according to (2), in which
  the detection circuit section includes a plurality of detection circuits, and
  the detection circuit section includes a reference generation circuit corresponding to each detection circuit.

(4) The imaging device according to (3), in which the luminance signal read from the readout circuit in time series from each of a plurality of the DVS pixels arranged in a column is input to the plurality of detection circuits.

(5) The imaging device according to (2), in which
the detection circuit section includes a plurality of detection circuits, and
the reference generation circuit supplies the reference voltage to the plurality of detection circuits.

(6) The imaging device according to (5), in which at least one of two inputs of the comparator is capacitively coupled, and at least one of the luminance signal or the reference voltage is connected.

(7) The imaging device according to (6), in which the luminance signal is input to the comparator via the capacitively coupled capacitor, an initial first luminance signal is input after the capacitor is initialized, and a second luminance signal held in the signal holding circuit is subsequently input.

(8) The imaging device according to any one of (2) to (7), in which the comparator is of multi-bit and also capable of analog-to-digital conversion.

(9) The imaging device according to (8), in which
the readout circuit includes an amplification transistor connected in series between a reference power supply and a signal line connected to the detection circuit, and a selection transistor, and
a capacitor of the signal holding circuit is connected between a gate of the amplification transistor and a reference potential.

(10) The imaging device according to (9), in which an anode of the photoelectric conversion element is connected to the logarithmic conversion circuit via a first switching element, and is connected to one end of the capacitor on a side of the reference power supply via a second switching element.

(11) The imaging device according to (9), in which an anode of the photoelectric conversion element is connected to one end of the capacitor on the side of the reference power supply via a first switching element, a floating capacitor, and a third switching element.

(12) The imaging device according to (11), in which a reset transistor that initializes stored charges of the floating capacitor is connected between the floating capacitor and a reference power supply.

(13) The imaging device according to (12), in which in a case where the second switching element turns to a conductive state, the first switching element and the third switching element are in a non-conductive state.

(14) The imaging device according to (9), in which an anode of the photoelectric conversion element is connected to a second readout circuit via a second switching element.

(15) The imaging device according to (1), in which the pixel array section further includes a gradation pixel.

(16) An imaging method of an imaging device that is a control method of an imaging device, the imaging device including
a pixel array section including a plurality of dynamic vision sensor (DVS) pixels that outputs a luminance signal according to a light amount, and
a detection circuit section that is disposed outside the pixel array section and outputs a detection signal indicating occurrence of an address event in a case where the luminance signal of each of the plurality of DVS pixels exceeds a predetermined threshold value, in which
the detection circuit section
includes a comparator to which the luminance signal read from the readout circuit and the reference voltage are input, and the luminance signal is input to the comparator via a capacitively coupled capacitor of the comparator, an initial first luminance signal is input after the capacitor is initialized, and a second luminance signal held in the pixel array section is subsequently input.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

30 Pixel array section
100 Imaging device
200 Solid-state imaging element
211b Second access control circuit
212a AD converter
212b DVS readout circuit
212c Time stamp generation circuit
212d Timing control circuit
213 First signal processing section
214 Second signal processing section
250 Arbiter circuit
308a Gradation pixel
308b DVS pixel
314 AFE for DVS

The invention claimed is:
1. An imaging device, comprising:
a pixel array section including a plurality of dynamic vision sensor (DVS) pixels configured to output a luminance signal based on a light amount; and
a detection circuit section configured to output a detection signal indicating occurrence of an address event based on the luminance signal of each of the plurality of DVS pixels exceeds a specific threshold value, wherein
the detection circuit section includes:
at least one comparator configured to perform analog-to-digital conversion, wherein the at least one comparator is of multi-bit; and
a first reference generation circuit configured to output a reference voltage,
the detection circuit section is outside the pixel array section, and
each of the plurality of DVS pixels includes;
a photoelectric conversion element configured to output a signal corresponding to the light amount;
a logarithmic conversion circuit configured to logarithmically convert the signal into the luminance signal;
a signal holding circuit configured to hold the luminance signal converted by the logarithmic conversion circuit; and
a readout circuit configured to read the luminance signal held in the signal holding circuit, wherein the readout circuit includes:
an amplification transistor connected in series between a reference power supply and a signal line connected to the detection circuit section; and a selection transistor,
a capacitor of the signal holding circuit is connected between a gate of the amplification transistor and a reference potential, and
the luminance signal read from the readout circuit and the reference voltage are input to the at least one comparator.

2. The imaging device according to claim 1, wherein the detection circuit section further includes:
a plurality of detection circuits; and
a second reference generation circuit corresponding to each detection circuit of the plurality of detection circuits.

3. The imaging device according to claim 2, wherein the luminance signal read from the readout circuit in time series from each of the plurality of the DVS pixels in a column is input to the plurality of detection circuits.

4. The imaging device according to claim 1, wherein
the detection circuit section further includes a plurality of detection circuits, and
the first reference generation circuit is further configured to supply the reference voltage to the plurality of detection circuits.

5. The imaging device according to claim 4, wherein
at least one of the luminance signal or the reference voltage input to the at least one comparator is capacitively coupled, and
the at least one of the luminance signal or the reference voltage is connected.

6. The imaging device according to claim 5, wherein
the luminance signal is input to the comparator via a capacitively coupled capacitor,
an initial first luminance signal is input to the comparator, subsequent to the capacitively coupled capacitor is initialized, and
a second luminance signal held in the signal holding circuit is subsequently input.

7. The imaging device according to claim 1, wherein
an anode of the photoelectric conversion element is connected to the logarithmic conversion circuit via a first switching element, and
the anode is connected to one end of the capacitor on a side of the reference power supply via a second switching element.

8. The imaging device according to claim 1, wherein an anode of the photoelectric conversion element is connected to one end of the capacitor on a side of the reference power supply via a first switching element, a floating capacitor, and a third switching element.

9. The imaging device according to claim 8, wherein a reset transistor configured to initialize stored charges of the floating capacitor is connected between the floating capacitor and the reference power supply.

10. The imaging device according to claim 9, wherein the first switching element and the third switching element are in a non-conductive state based on a second switching element turns to a conductive state.

11. The imaging device according to claim 1, wherein an anode of the photoelectric conversion element is connected to a second readout circuit via a second switching element.

12. The imaging device according to claim 1, wherein the pixel array section further includes a gradation pixel.

13. An imaging method, including:
in an imaging device:
outputting, by a pixel array section including a plurality of dynamic vision sensor (DVS) pixels, a luminance signal based on a light amount;
outputting, by a reference generation circuit in a detection circuit section, a reference voltage, wherein the detection circuit section is outside the pixel array section;
performing, by at least one comparator in the detection circuit section to which the reference voltage and the luminance signal read from a readout circuit in each of the plurality of DVS pixels are input, analog-to-digital conversion, wherein
the at least one comparator is of multi-bit,
the luminance signal is input to the least one comparator via a capacitively coupled capacitor of the at least one comparator,
an initial first luminance signal is input to the least one comparator, subsequent to the capacitively coupled capacitor is initialized,
a second luminance signal held in the pixel array section is subsequently input to the least one comparator,
the readout circuit includes:
an amplification transistor connected in series between a reference power supply and a signal line connected to the detection circuit section; and
a selection transistor, and
a capacitor, of a signal holding circuit in each of the plurality of DVS pixels, is connected between a gate of the amplification transistor and a reference potential; and
outputting, by the detection circuit section, a detection signal indicating occurrence of an address event based on the luminance signal of each of the plurality of DVS pixels exceeds a specific threshold value.

* * * * *